United States Patent
Chen et al.

(10) Patent No.: US 10,812,373 B2
(45) Date of Patent: Oct. 20, 2020

(54) DATA NETWORK

(71) Applicant: Sony Corporation, Minato-ku (JP)

(72) Inventors: Jian-Rong Chen, Shinfield (GB); Richard Cooper, Basingstoke (GB)

(73) Assignee: Sony Corporation, Minato-ku (JP)

( * ) Notice: Subject to any disclaimer, the term of this patent is extended or adjusted under 35 U.S.C. 154(b) by 0 days.

(21) Appl. No.: 16/245,466

(22) Filed: Jan. 11, 2019

(65) Prior Publication Data

US 2019/0245775 A1    Aug. 8, 2019

(30) Foreign Application Priority Data

Feb. 2, 2018  (GB) .................................. 1801772.3

(51) Int. Cl.
| | | |
|---|---|---|
| *H04L 12/729* | (2013.01) | |
| *H04L 12/751* | (2013.01) | |
| *H04L 12/715* | (2013.01) | |
| *H04L 12/741* | (2013.01) | |
| *H04L 12/717* | (2013.01) | |

(52) U.S. Cl.
CPC ............ *H04L 45/125* (2013.01); *H04L 45/02* (2013.01); *H04L 45/42* (2013.01); *H04L 45/54* (2013.01); *H04L 45/64* (2013.01)

(58) Field of Classification Search
CPC ....... H04L 45/125; H04L 45/02; H04L 45/42; H04L 45/54; H04L 45/64; H04L 49/351; H04L 45/74
See application file for complete search history.

(56) References Cited

U.S. PATENT DOCUMENTS

| | | | |
|---|---|---|---|
| 2002/0080755 A1 | 6/2002 | Tasman et al. | |
| 2015/0043589 A1 | 2/2015 | Han et al. | |
| 2015/0200910 A1* | 7/2015 | Yamada | ................ H04L 61/103 370/254 |
| 2015/0319078 A1* | 11/2015 | Lee | ..................... H04L 12/6418 370/392 |

(Continued)

FOREIGN PATENT DOCUMENTS

WO    WO 2016/029945 A1    3/2016

OTHER PUBLICATIONS

British Search Report dated Jul. 10, 2018 in British Application 1801772.3, filed on Feb. 2, 2018.

*Primary Examiner* — Kibrom T Hailu
(74) *Attorney, Agent, or Firm* — Oblon, McClelland, Maier & Neustadt, L.L.P.

(57) ABSTRACT

A packet-based software-defined data network supporting multicast, unicast and/or broadcast packet-based data traffic types comprises a software defined network (SDN) controller; and a network of one or more packet switches arranged to route, under the control of the SDN controller, data packets from one or more packet sources to one or more packet receivers, in which the SDN controller is responsive to data defining a topology of interconnections between the plurality of packet switches, packet sources, and packet receivers, to select a route for packets from a packet source to a packet receiver; the SDN controller being configured to select the route in dependence upon the traffic type of the packets to be routed, using a respective one of a set of route selection algorithms each applicable to one of multicast, unicast and broadcast packet-based data traffic types.

19 Claims, 16 Drawing Sheets

(56) References Cited

U.S. PATENT DOCUMENTS

| | | | |
|---|---|---|---|
| 2016/0112326 A1* | 4/2016 | Farmanbar | H04W 28/12 |
| | | | 370/230.1 |
| 2016/0234578 A1* | 8/2016 | Sareen | H04Q 11/0062 |
| 2016/0241467 A1 | 8/2016 | Gunasekaran et al. | |
| 2016/0294732 A1 | 10/2016 | Chou et al. | |
| 2017/0005906 A1* | 1/2017 | Chen | H04L 45/64 |
| 2017/0033939 A1* | 2/2017 | Bragg | H04L 12/18 |
| 2017/0063637 A1* | 3/2017 | Kashyap | H04L 41/12 |
| 2017/0163502 A1* | 6/2017 | MacNeil | H04L 41/12 |
| 2017/0171066 A1* | 6/2017 | Hao | H04L 45/125 |
| 2017/0187609 A1* | 6/2017 | Lee | H04L 12/6418 |
| 2017/0222914 A1* | 8/2017 | Fedyk | H04L 45/122 |
| 2017/0222918 A1* | 8/2017 | Sebastian | H04L 12/6418 |
| 2018/0324083 A1* | 11/2018 | Caire | H04L 45/124 |

* cited by examiner

Destination-Timed Switching using SDN Switch

Switch-Timed Switching using SDN Switch

Source: 232.0.0.1@10.0.0.1    Source: 232.0.0.3@10.0.0.3    Receiver: @10.0.0.5
Source: 232.0.0.2@10.0.0.2    Receiver: @10.0.0.4

Source: 232.0.0.1@10.0.0.1    Source: 232.0.0.3@10.0.0.3    Receiver: @10.0.0.5
Source: 232.0.0.2@10.0.0.2    Receiver: @10.0.0.4          Receiver: @10.0.0.6

DATA NETWORK

BACKGROUND

Field

This disclosure relates to data networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

In a traditional packet-based network, a so-called control plane and a so-called data plane both exist directly on each network device. However, in so-called Software Defined Networking, there is an abstraction of the control plane from the network device. The control plane exists in a separate SDN controller layer. It can interact with the data plane of a network device (such as a switch or router) for example via a controller agent on the network device (using a protocol such as "OpenFlow").

Software defined networking allows more flexible network architectures, potentially with centralised control. The SDN controller is able to oversee the whole network and thus potentially to provide better forwarding policies than would be the case in the traditional network.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
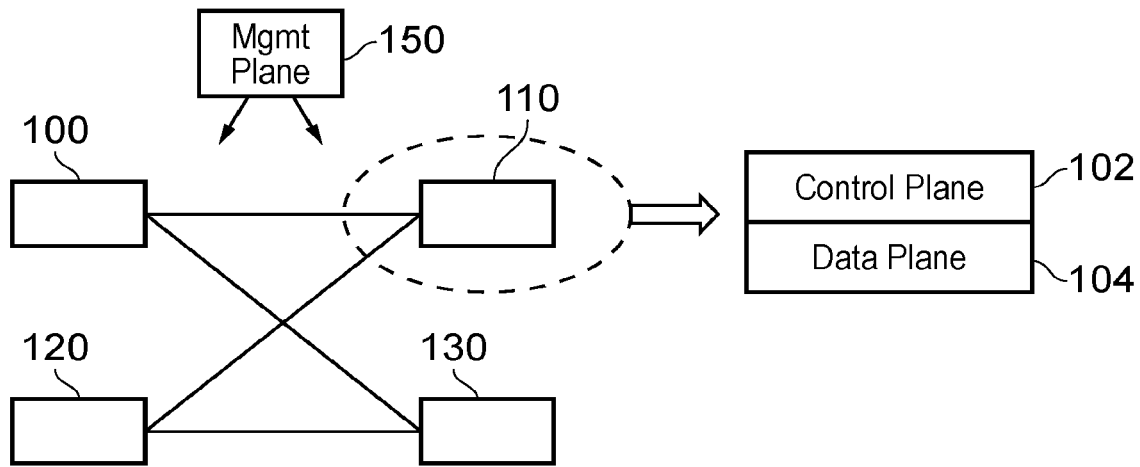
FIG. 1 schematically illustrates a so-called traditional network.

Referring now to the drawings, FIG. 1 schematically illustrates a previously proposed network packet routing arrangement in which (in this example) four network switches or routers 100 . . . 130 are interconnected by data connections 140.

This type of network device, for example switches and routers, are traditionally thought of as consisting of three planes: the management plane (implemented in FIG. 1 by a separate device 150), the control plane 102 and the data plane 104.

In the arrangement of FIG. 1, the management plane is used to manage the network device through its network connection. It typically uses protocols such as Simple Network Management Protocol (SNMP), Telnet, File Transfer Protocol (FTP), Secure FTP or Secure Shell (SSH) to allow the user to monitor the device or send commands to it using a command-line interface (CLI).

The control plane 102 handles decisions such as packet forwarding and routing. On previously proposed network devices such as those of FIG. 1, this can be done with static routes or dynamic routing protocols (such as OSPF—Open Shortest Path First). The control plane provides the information used to build the forwarding table that is used by the data plane.

The data plane uses the forwarding table created by the control plane to process the network data packets. It is sometimes known as the forwarding plane or user plane. Data plane forwarding is processed in dedicated hardware or high-speed code. The data plane is where most of the network device's activity occurs.

Software Defined Networking (SDN)

In a traditional network (non-SDN), the control plane and data plane both exist directly on the network device as shown schematically in FIG. 1. However, in so-called Software Defined Networking, there is an abstraction of the control plane from the network device. The control plane exists in a separate SDN controller layer 200. It interacts with the data plane 204 of a network device 210 (such as a switch or router) via a controller agent 202 on the network device 210 (using a protocol such as "OpenFlow"). The SDN controller 200 controls the network to adopt a routing arrangement for data packets by providing control signals and/or instructions to the network devices, for example by a so-called "Southbound API" (discussed below).

Software defined networking allows more flexible network architectures, potentially with centralised control. The SDN controller 200 is able to oversee the whole network and thus potentially to provide better forwarding policies than would be the case in the arrangement of FIG. 1.

Figure 2:
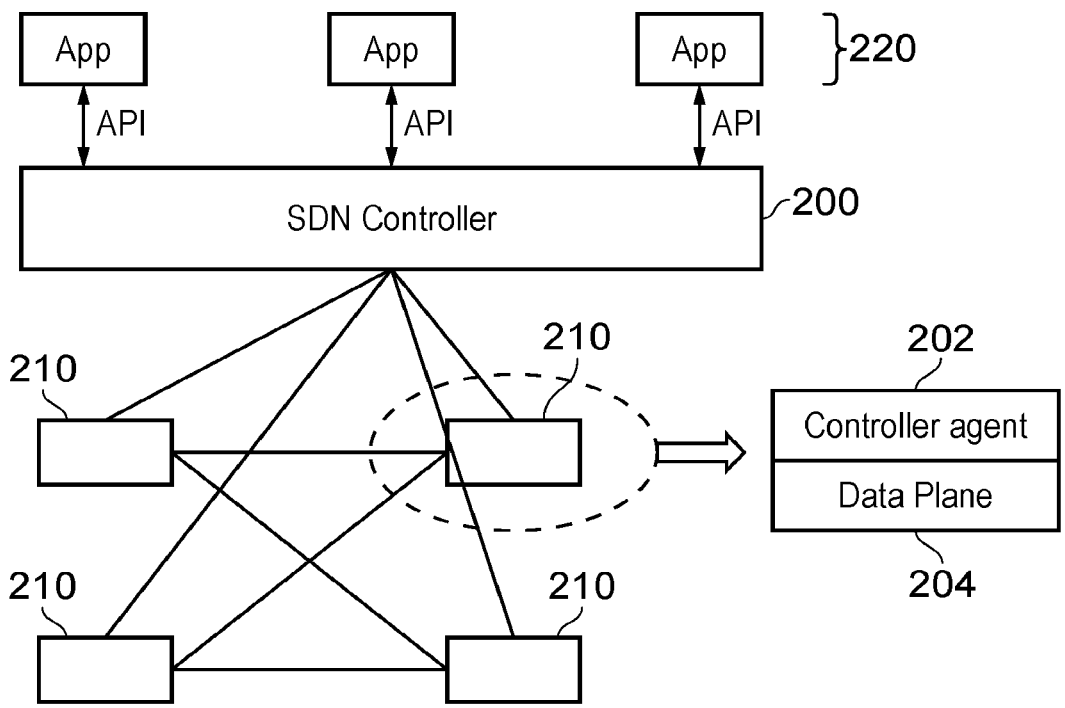
FIG. 2 schematically illustrates a so-called software defined network.

Considering the interfaces with the SDN controller 200 in FIG. 2, these are sometimes referred to by a schematic notation relating to the direction in which they are drawn on a typical representation such as that of FIG. 2.

Southbound API

The so-called Southbound API (application programming interface) refers to the interface between the SDN controller and the network device. It has this name because it is typically drawn in a diagrammatic representation (which may or may not be entirely different to a physical arrangement or layout) as running generally downwards with respect to the SDN controller. "OpenFlow" is an example of an SDN protocol for the Southbound API.

Northbound API

The Northbound API refers to the communication between applications 220 and the SDN controller 200. It has this name because it is typically drawn as running generally upwards with respect to the SDN controller in a diagrammatic representation (which may or may not be entirely different to a physical arrangement or layout).

Network Virtualisation and Network Functions Virtualisation

SDN can be considered as complementary to Network Virtualisation (NV) and Network Functions Virtualisation (NFV).

NV allows virtual networks to be created that are decoupled from the underlying network hardware. NFV abstracts network functions to a generic server platform rather than relying on a specific hardware device to provide the function.

SDN can provide the flexibility required for a range of NFV use cases.

SDN Switches

There are several types of network switch available to purchase in today's market. These include so-called open switches which are switches in which the hardware and software are separate entities that can be changed independently of each other (in contrast to proprietary switches in which the software and hardware are integrated.)

So-called bare metal switches are hardware only and ready to be loaded with the operating system of the user's choice. A bare metal switch often comes with a boot loader called the Open Network Install Environment (ONIE), which allows the user to load an operating system onto the switch.

So-called white box switches and Brite box switches are bare metal switches but with an example operating system already installed. The latter type may carry a manufacturer's logo or brand name.

These various switches my generally be considered under the term "commercial off-the-shelf ("COTS") switches".

Video Switching

Figure 3:
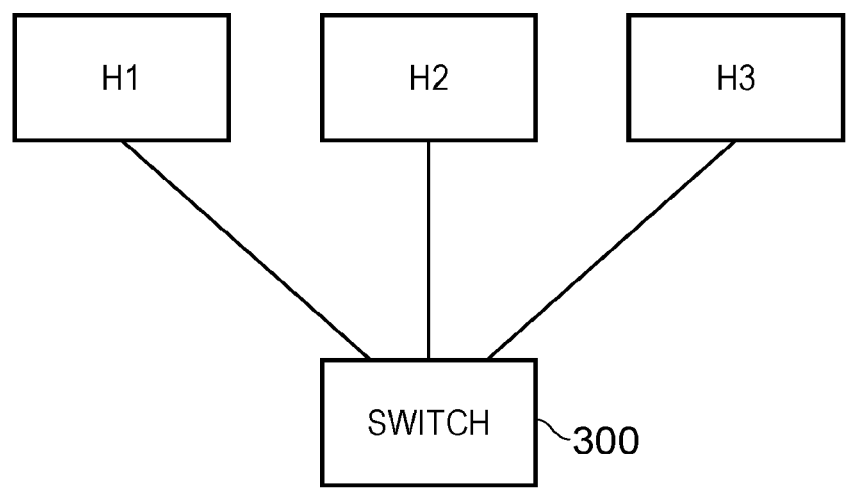
FIG. 3 schematically illustrates an example network.

FIG. 3 is a schematic representation of three data handling devices or "hosts" H1 . . . H3, interconnected by a switch or router 300 of the type discussed with reference to FIG. 2. For example, the host devices H1, H2 may be video source devices (such as video cameras or video reproduction devices, or at least network interfaces connected or connectable to cameras or video reproduction devices) and the host device H3 may be a video sink device such as a display or video storage device, or at least a network interface connected or connectable to a display or video storage device.

Video switching can place potentially high demand on the switch infrastructure, both in terms of data throughput and also timing constraints so as to provide neat (jitter or interruption—free) transitions between different video sources. In the context of video switching, the benefit of an SDN-based approach is that it allows controller software to be written that can be used to control relatively low-cost COTS switches so as to meet such constraints.

Clean video switching requires accurately timing a particular switching operation (or in other words, a change in the data plane forwarding behaviour) so that it occurs during the vertical blanking period of the video signal(s), and/or by a method to be described below.

Clean switching from one video signal to another with a non-SDN switch of the type shown in FIG. 1 typically means using destination-timed switching, for example in which the "new" signal is joined so that both source video signals are received simultaneously for an overlap period and then the "original" signal is dropped. This can involve several delays and the requirement for double-buffering on the destination device. It can also require double the bandwidth (compared to delivery of a single video signal) to the destination device, at least during an overlap period. Some of these disadvantages can be overcome by using SDN-based switching.

Figure 4:
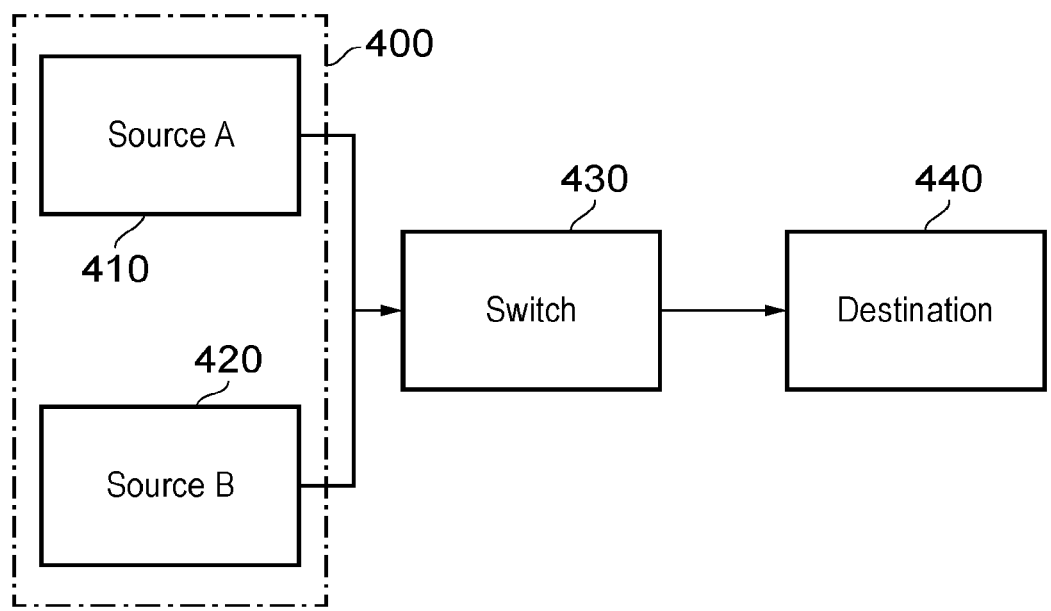
FIG. 4 schematically illustrates a timed switching operation.

FIG. 4 schematically illustrates switching between two video sources 400, Source A 410 and Source B 420 using an SDN switch 430 so as to deliver a selected one of the two sources to a destination or sink device 440. Various possibilities will be discussed below, namely destination-timed switching, source-timed switching and switch-timed switching.

In destination-timed switching, the destination may follow the general process of:
- receiving just from source A
- receiving from A and B (so called double buffering, using (temporarily) double the communication bandwidth
- switching from A to B at a switching point
- receiving just from source B In source-timed switching, the sources change their packet header values to trigger a new flow on the switch 430.

In switch-timed switching, the switch 430 changes its flows at a precise time.

These options will be discussed with reference to FIGS. 5 to 7, each of which illustrates in a schematic timing diagram (time running vertically down the page) the interactions between a broadcast controller ("BC") 500, the controller 200, the switch 430 and the destination device 440. Amongst the two sources 400, these are referred to as Source S1 (being the "original" one of the sources A and B which is providing video to the destination at the start of the process), and the Source S2 which is the "new" source which the destination device is switched to, so that by the end of the switching process video is being provided from the Source S2 but not the Source S1. The Sources S1 and S2 can clearly be arbitrary (but different) ones of the Sources A and B of FIG. 4.

Therefore, in examples the packet source is a video packet source, and the packet receiver is a video packet receiver.

Figure 5:
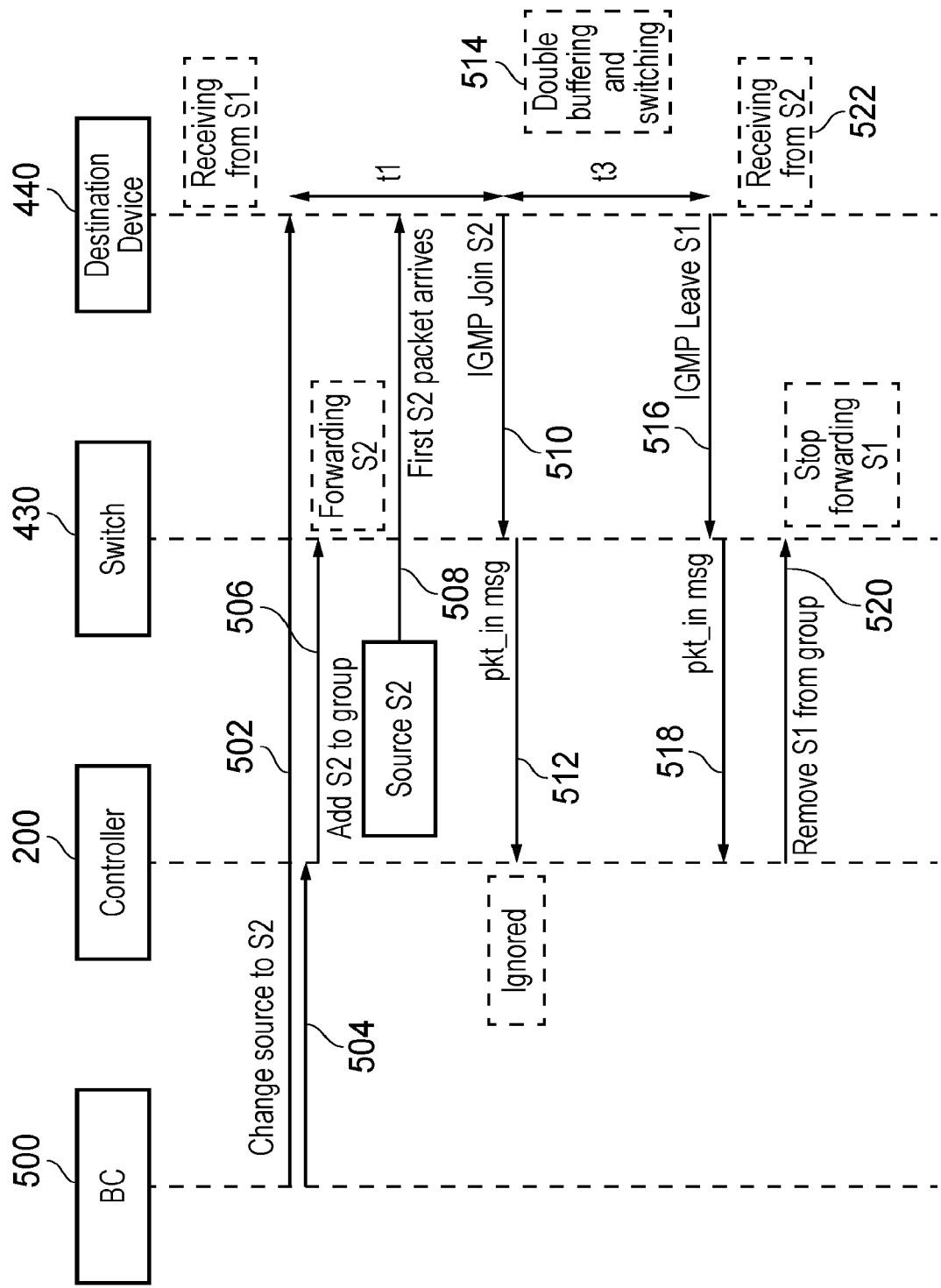
FIGS. 5 to 7 are schematic timing diagrams illustrating example switching operations.

Destination-Timed Switching Using SDN Switch (FIG. 5)

Using an SDN switch can reduce the latency of destination-timed switching (compared to using a non-SDN switch). The switch can begin forwarding packets from the second source in advance of the destination device's request, removing some of the delay.

Referring to FIG. 5, a first stage 502 is that the BC 500 sends a message to the destination device 440 instructing a change of source to the source S2. Note that until that point, the destination device 440 had been receiving video signals from the source S1. The BC 500 requests the controller 200 by a request 504, which in turn requests the switch 430 by a request 506 to start forwarding video data from the source S2 and, in due course, a first packet arrives at the destination device from the source S2 at a stage 508. The destination device, a time t1 after the request 502, issues an IGMP join request to the switch 430 to join S2 at a stage 510. The switch 430 may still send a legacy IGMP join message 512 to the controller 200 but this may be ignored (at least in part because it is not necessary; the request 506 has already caused the correct routing to be applied in advance, which is how the timing advantages are provided. The IGMP message may still be used, but as a backup).

A period of double buffering and switching, during a period t3 occurs 514, at the end of which the destination device issues an IGMP leave instruction to leave the group relating to S1 at a stage 516. The switch 430 sends a packet 518 to the controller 200 which then issues a request 520 to the switch to remove S1 from the group and the switch stops forwarding packets from S1. The destination device 440 is now receiving only from S2 522.

Figure 6:
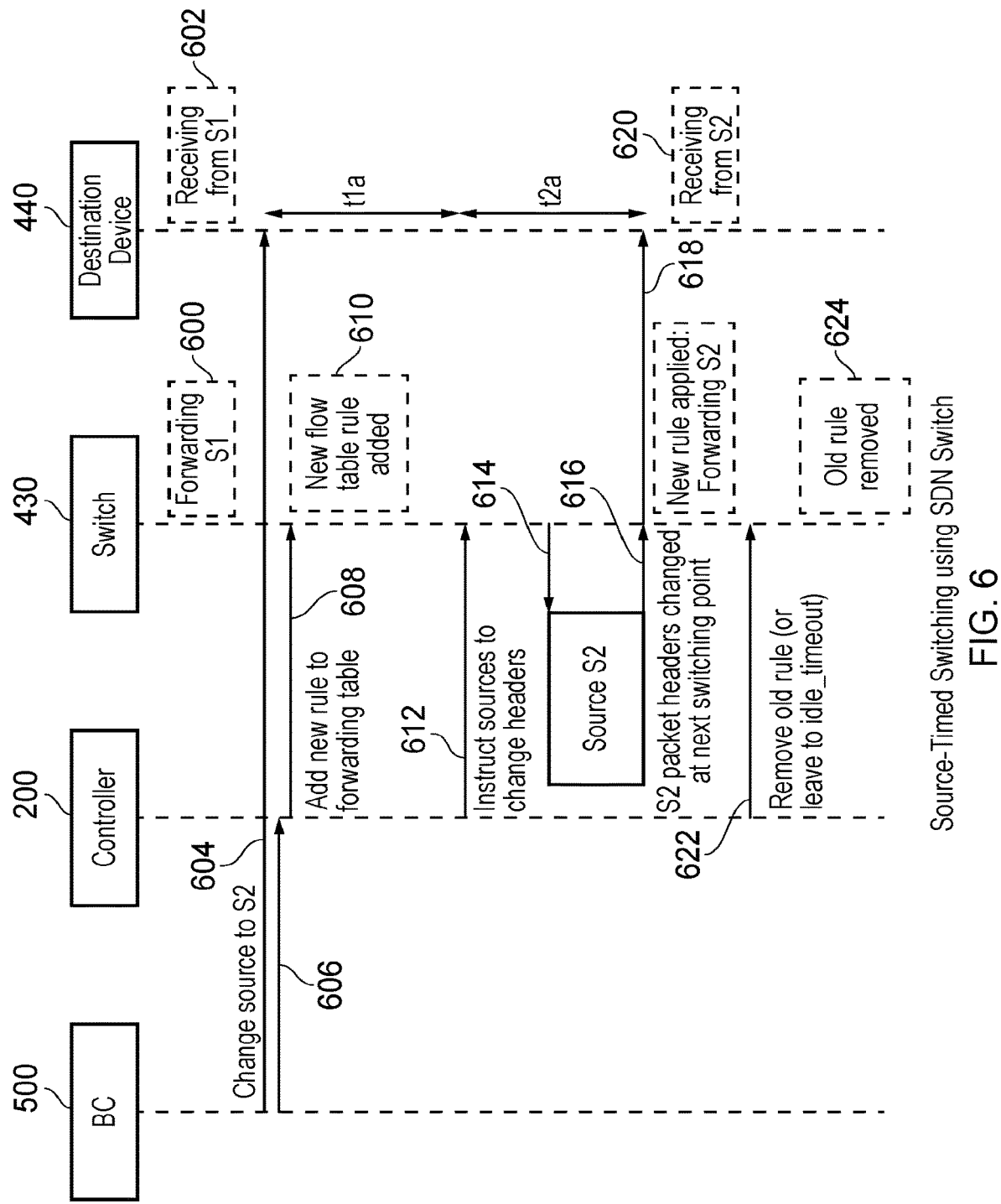

Source-Timed Switching Using SDN Switch (FIG. 6)

Source-timed switching involves adding new flow rules to the switch that depend on some header information in the source packets. The sources can then change this header information at a precise time to carry out an accurately-timed switching operation.

Referring to FIG. 6, initially the switch 430 is forwarding packets from S1 600 and the destination device 440 is receiving from S1 602.

The BC 500 issues a request to the destination device 440 to change 604 the source to S2. The BC 500 also issues a request 606 to the controller which in turn instructs the switch 608 to add a new rule to the switch's forwarding table. The new rule is added at a stage 610.

The controller 200 instructs 612 the sources to change headers, which results in the switch 430 issuing an instruction or request 614 to the sources so that the packet headers are changed at the next switching point 616 and a new rule is applied by the switch 430 (at a stage 618 to forward packets from S2 so that the destination device 440 is receiving 620 from S2).

Note that the request 614 could be considered to be the 'same' message as 612, travelling via the switch. in other words, the message 612 could be an OpenFlow Packet Out command, causing the message 614 to be emitted. However, it can be useful to view the arrangement conceptually as the controller sending the message to Source S2 via the switch.

Note also that the command or message 612/614 could come from the BC at any time after the new forwarding rule has been applied.

The new rule is already applied (at the stage 608). The stage 618 is the stage when the rule starts matching the packets, because the packet headers change due to the instructions 612 and 614.

As a worked schematic example, assume initially that the source S2 is sending UDP packets with a destination address dst_addr=232.0.0.1 and a source port src_port=5000, and the destination device is on Port 1 of the Switch. The stage 608 sets a rule on the switch "Match src_addr=232.0.0.1, src_port=5001: Action=Output Port 1". At this time the source S2 is sending with src_port=5000, so the rule does not currently match any packets, and S2's packets continue to be dropped. the instructions at 612/614 instruct the source S2 to start outputting with src_port=5001 (instead of 5000) at the next switching point. At the stage 616, the source S2 switches from src_port=5000 to 5001. The packets now match the rule 608, and start to be emitted from Port 1 to the Destination Device. At the stage 622, whatever rule was originally causing packets from Source 1 to Port 1 is removed (or timed out), so that by a stage 624 the old rule is no longer present.

Figure 7:
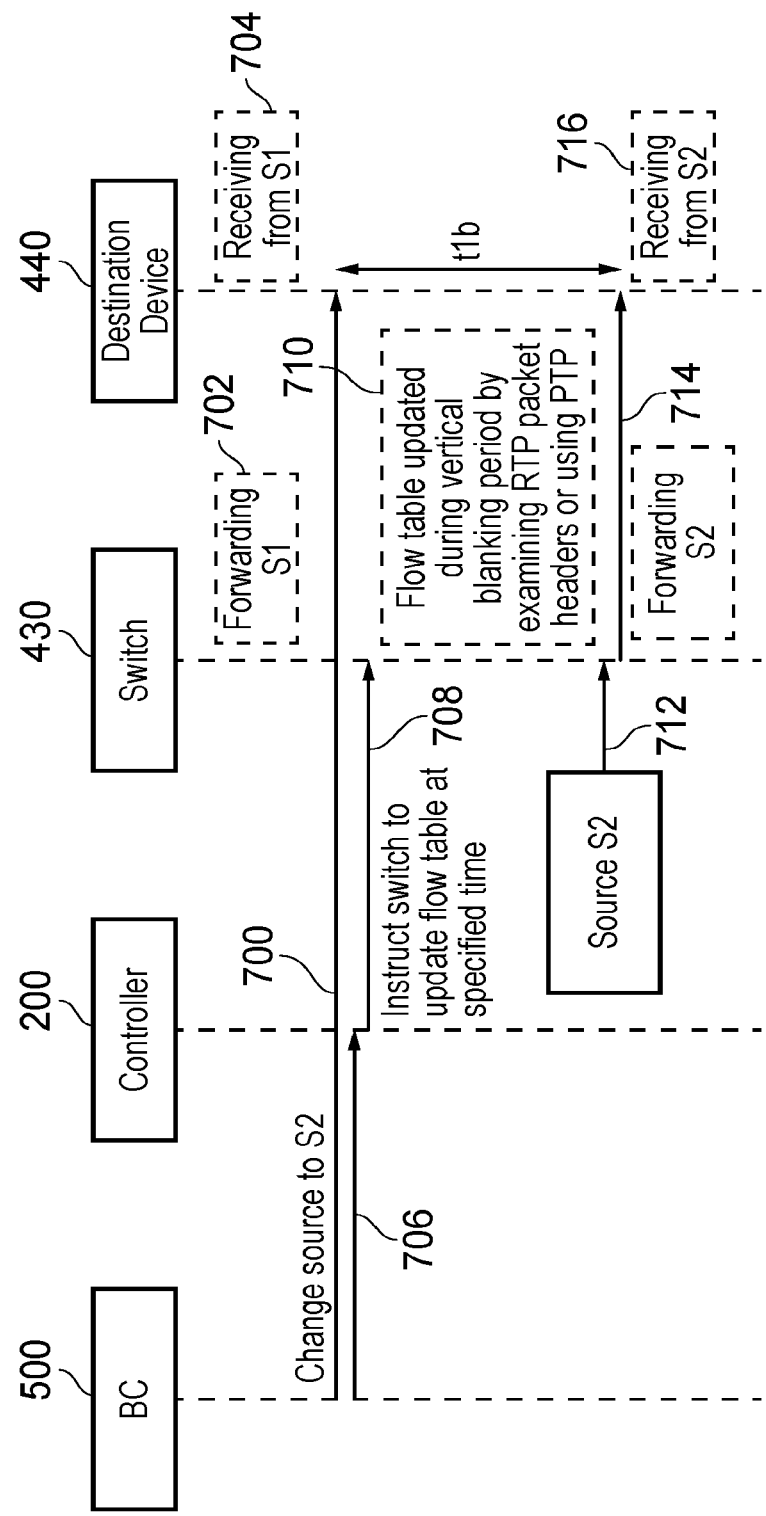

Switch-Timed Switching Using SDN Switch (FIG. 7)

Switch-timed switching involves instructing the switch to update its flow table at a precise time. The switch identifies the appropriate time to update its table either by examining the RTP headers of the packets for end-of-frame information or by being compatible with the Precision Time Protocol (PTP). This method relies on the switch being able to perform the flow table update very quickly and if the packets arrive equally spaced in time this leaves a relatively small time window to achieve this. However, in example arrangements so-called "packet-shaping" may be used so that there is a longer gap between packets during the vertical blanking period of each video frame.

Referring to FIG. 7, once again the BC 500 issues a request 700 to the destination device to change source to S2. Before this is received, the switch 430 is forwarding packets from S1 702 and the destination device 440 is receiving packets from S1 704.

The BC 500 issues a request 706 to the controller 200 which in turn instructs the switch 708 to update the flow table at a specified time. The switch updates the flow table by an operation 710 during a vertical blanking period, which the switch 430 identified by examining RTP (real time protocol) packet headers or by using the PTP (precision time protocol).

The changes to the flow table imply that after the changes have been made, packets 712 from the source S2 are provided to the switch and are forwarded 714 to the destination device 440 so that after the update to the flow table, the destination device 440 is receiving 716 from the source S2.

Note that the packets 712 will have been being sent to the switch previously. The changes to the forwarding table 710 will cause them to be forwarded from 714. Although not shown in FIG. 7, optionally the update at 710 could simultaneously remove the rule forwarding packets from S1.

Example SDN Controller

Figure 8:
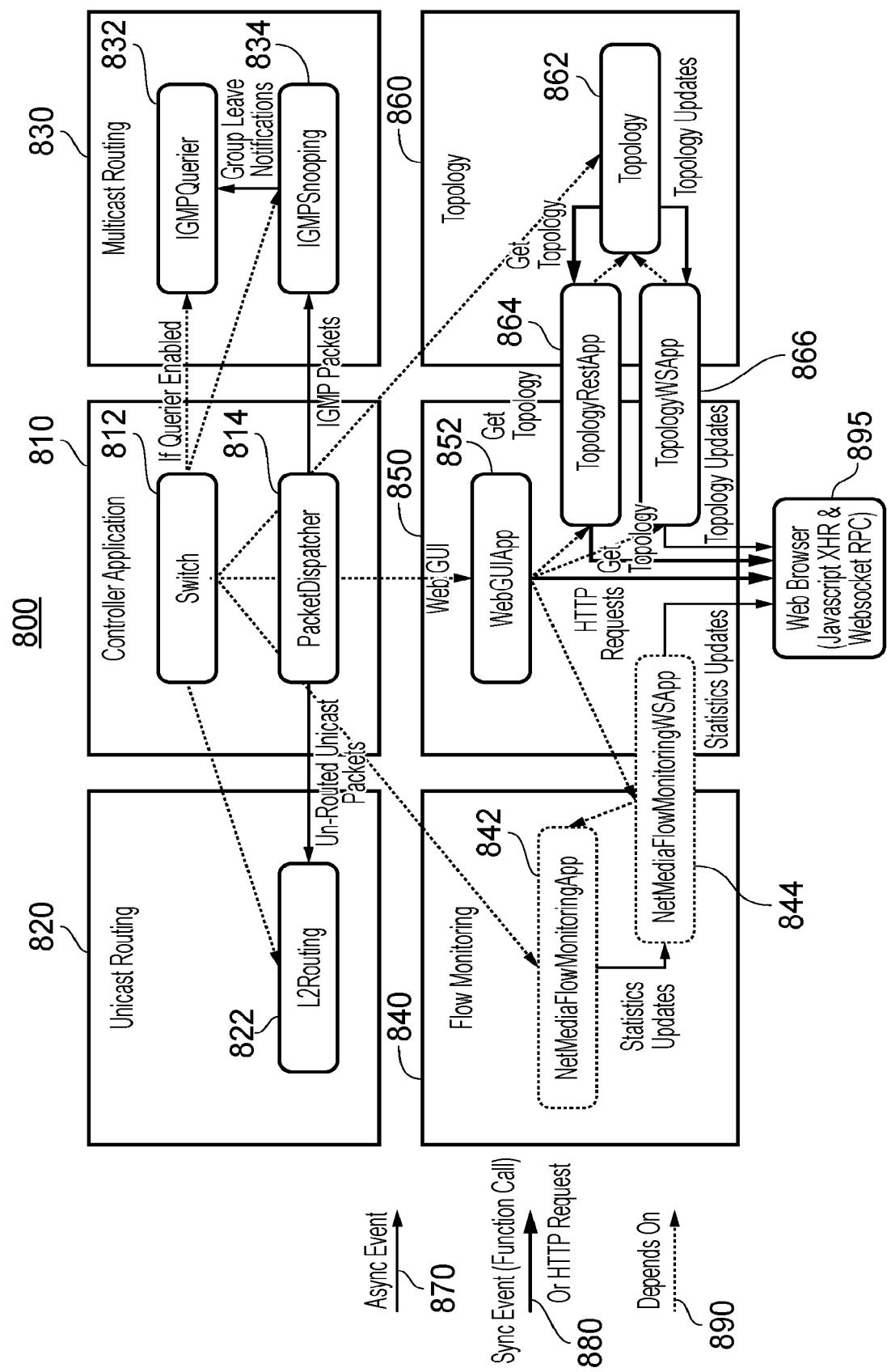
FIG. 8 schematically illustrates an example SDN controller.

FIG. 8 schematically illustrates an example controller for use as an SDN controller 800, comprising a controller application 810, a Unicast routing module 820, a Multicast routing module 830, a flow monitoring module 840, a graphical user interface (GUI) module 850 and a topology module 860.

Some example interactions and dependencies between the modules are illustrated, with asynchronous (async) events being illustrated by a set of lines 870, synchronous events or function calls or HTTP requests being indicated by lines 880 and functional dependencies being indicated by arrows 890. A web browser 895 can interact with the GUI module 850 (for example by the Northbound API) to provide user monitoring and/or control of the system.

Turning to the sub-modules illustrated in FIG. 8, within the controller application 810 a Switch module 812 is responsible for loading at least some of the other modules and configuring system logging and the like. A PacketDispatcher 814 is responsible for receiving packets sent to the controller and dispatching them to the correct modules.

In the Unicast routing module 820, an L2Routing module 822 is a Unicast learning switch and will be described in more detail below.

In the Multicast routing module 830, there is provided an IGMPQuerier module 832 which handles IGMP queries, including sending periodic general queries and group specific queries on group leave events and an IGMPSnooping module 834 which is responsible for updating the switch forwarding tables based on group join and group leave events.

The topology module 860 comprises a Topology module 862 responsible for building a model of the network topology, tracking changes to the topology and sending change notification events. This communicates with a TopologyRestApp 864 which supplies a snapshot of the topology model in JavaScript Object Notation (JSON) format, on request, via HTTP and a TopologyWSApp 866 which sends notifications of updates to the topology model via a JSON RPC (remote procedure call) over a websocket.

The GUI module 850 comprises a WebGUIApp module 852 which serves the static and templated assets of the web GUI via HTTP and which communicates with the web browser 895.

The flow monitoring module 840 comprises a FlowMonitoringApp module 842 which monitors flow and port traffic statistics, sending periodic updates as async events, and which communicates with a FlowMonitoringWSApp module 844 which sends flow and port traffic statistics updates as a JSON RPC over a websocket.

JSON Files

This configuration file, or these configuration files, can specify the topology of the network being managed by the controller ('topology information'), for example defining data interconnections within the network, as well as the locations and functions (broadcast/unicast/multicast; send/receive) of the network endpoints ('endpoint information'). The topology information and endpoint information could be one file per configuration, or split into multiple files (such as configA.topology.json & configA.endpoints.json) respectively defining the topological relationship of nodes and the network locations and properties of endpoints as discussed above.

In other examples, a different type of document or file (or documents or files) defining the network configuration can be employed. In other words, the embodiments are not limited to the use of one or multiple JSON files.

In a general sense, these network configuration files can be static, in the sense that they are generated at the outset of network design, or at least aspects of them can be cumulative in that as a device is added to the network, a portion of a network configuration file relating to the newly added device is added to the existing file.

It may be convenient to provide these as separate files or documents, of file or document fragments because (for example) one of these may be automatically obtained for example using LLDP, and the other may be statically or manually established.

In some examples, all or part of the JSON configuration might be transmitted in the body of an HTTP request or response, and such a JSON or other configuration 'document' would then be incorporated into a larger configuration 'document', which might exist tangibly on disk and/or intangibly in the memory of the SDN controller.

Some aspects of the network configuration files can be acquired in an automated operation, for example employing "LLDP" discovery using the so-called Link Layer Discovery Protocol (LLDP) which is a protocol used by network devices for advertising their identity and/or capabilities to neighbours on a network segment.

As mentioned above, more than one file or document may be used. For example, the network definition data or file(s) may comprise, as one file or multiple respective files:
topology data defining a network topology; and
endpoint data defining network locations and functions of network endpoints.

It may be convenient to provide these as separate files because (for example) one of these may be automatically obtained for example using LLDP, and the other may be statically or manually established.

An example of the topology data can provide data such as:
an identifier of each network switch, and for each one:
identifiers of ports of the switch
identifiers of connections of those ports with ports of other switches
data transfer properties of each port, including for example bandwidth, type of port, identifier of endpoint connected to that port An example of the endpoint data can provide data such as:
device identifier, and for each device:
device type (such as an audio/video device, manager device, controller device)
network interface details such as IP address
switch identifier
switch port identifier
one or more "streamer" identifiers; a device can have multiple streamers, each of which can be a sender or a receiver and can be associated with multicast, broadcast or unicast traffic types.
In the case of a multicast traffic type, a multicast address in the multicast range 24.0.0.0 to 239.255.255.255 is provided
multicast routing information if applicable
streamer bandwidth information Aspects of the operation of at least some of these modules will now be described.

Unicast Routing

Aspects of Unicast routing in a software defined network of the type discussed above will now be discussed with reference to FIGS. 9 to 12.

Unicast Strategy 1

Figure 9:
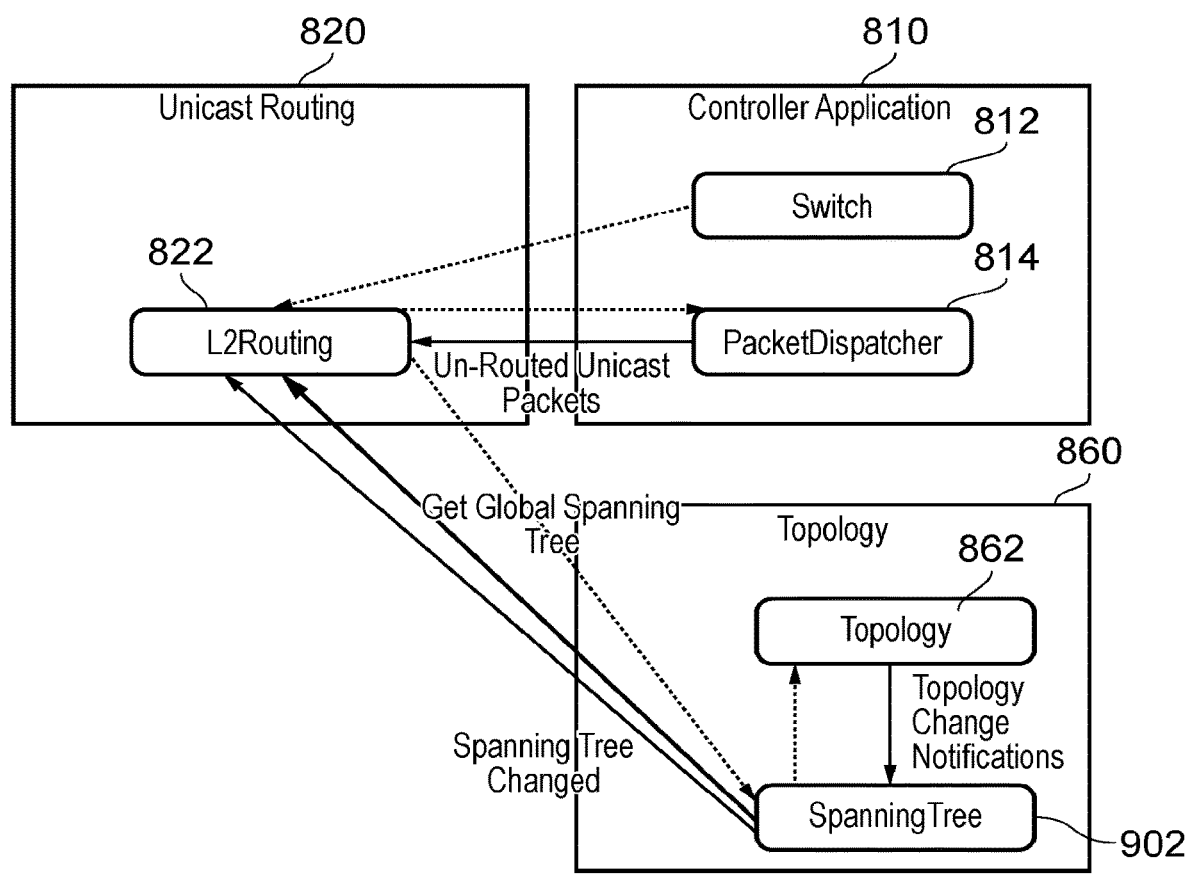
FIG. 9 schematically illustrates an example of unicast data transmission.

As shown in FIG. 9, three modules of the SDN controller which are particularly involved in Unicast routing are the Unicast routing module 820, the controller application module 810 and the topology module 860.

The Topology module 862 reads the network topology from a JSON file, and/or performs automatic LLDP discovery using the so-called Link Layer Discovery Protocol (LLDP) which is a protocol used by network devices for advertising their identity, capabilities to neighbours on a network segment.

Multiple links between switches are treated as a single link group from a topology perspective, and one link from the group is chosen by some arbitrary metric (for example at random) for unicast traffic. This assumes unicast traffic is relatively low bandwidth and, for the purposes of load balancing, can be ignored compared to potentially higher volumes of multicast traffic. These assumptions are treated as being valid in the context of a video packet network, for example.

A SpanningTree module 902 generates a Global Spanning Tree for the network. The Spanning Tree is generated globally using an algorithm such as Bellman-Ford or Prim's Algorithm.

Because the system is not using a distributed algorithm, it can select an appropriate root node for the Global Spanning Tree.

When packets are received from an unrecognised MAC (media access control) address (aa:aa:aa:aa:aa:aa) at Switch Sn, the L2Routing module 822 queries the SpanningTree module 902 for information about the spanning tree at Sn, and the packet is flooded (which in this context can involve outputting to all ports on the spanning tree except the ingress port) to the ports of Sn which are on the spanning tree to make sure that all switches receive the packet. The controller also deduces that the route to MAC address aa:aa:aa:aa:aa:aa is via the ingress port of the packet to Sn, and 'learns' this MAC address by installing a forwarding rule on Sn for this address and port. Changes to the topology are notified using asynchronous events. Topology changes might require the learned routes to be updated or re-learned. In this arrangement the if the L2Routing module 822 does not store a state dependent on the learned routes, an example strategy represented by FIG. 9 for handling topology changes is to cause all the learned routes to be dropped or discarded from the Switches' forwarding planes, in response to which the switches would then go back into learning mode. This is an example in which the SDN controller is configured to discard at least one or more of the selected routes in response to detection of a change in the topology.

Unicast Strategy 2

Another example strategy is as follows.

As a new MAC address is encountered at the border of the network, the SpanningTree module 902 generates a Spanning Tree for that MAC address on demand. The routes for that Spanning tree are then applied to the network (all switches) globally.

Each attached host could have its own L2 spanning tree.

If the topology changes, the L2Routing module 822 would be notified, and the Unicast routes would be re-generated (or the network would go back into learning mode). However it is considered that in a practical system topology changes are likely to be infrequent.

This method has potential to be more efficient than Strategy 1 for large and complex topologies, but is algorithmically potentially more complicated.

If there are multiple links between two switches, for Unicast the SpanningTree module 902 presents this as one link chosen by some arbitrary metric (for example, randomly). If that link is removed, a new link will be chosen and the topology change will be notified.

Figure 10:
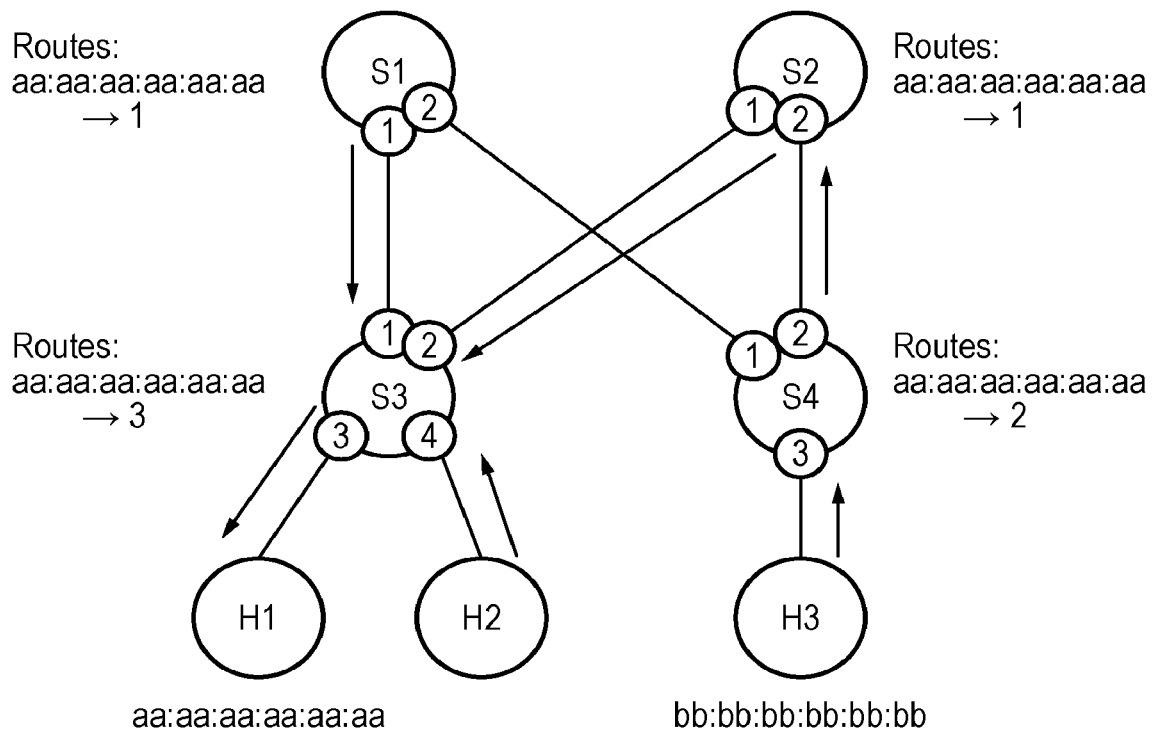
FIGS. 10 and 11 schematically represent example communications.
Figure 11:
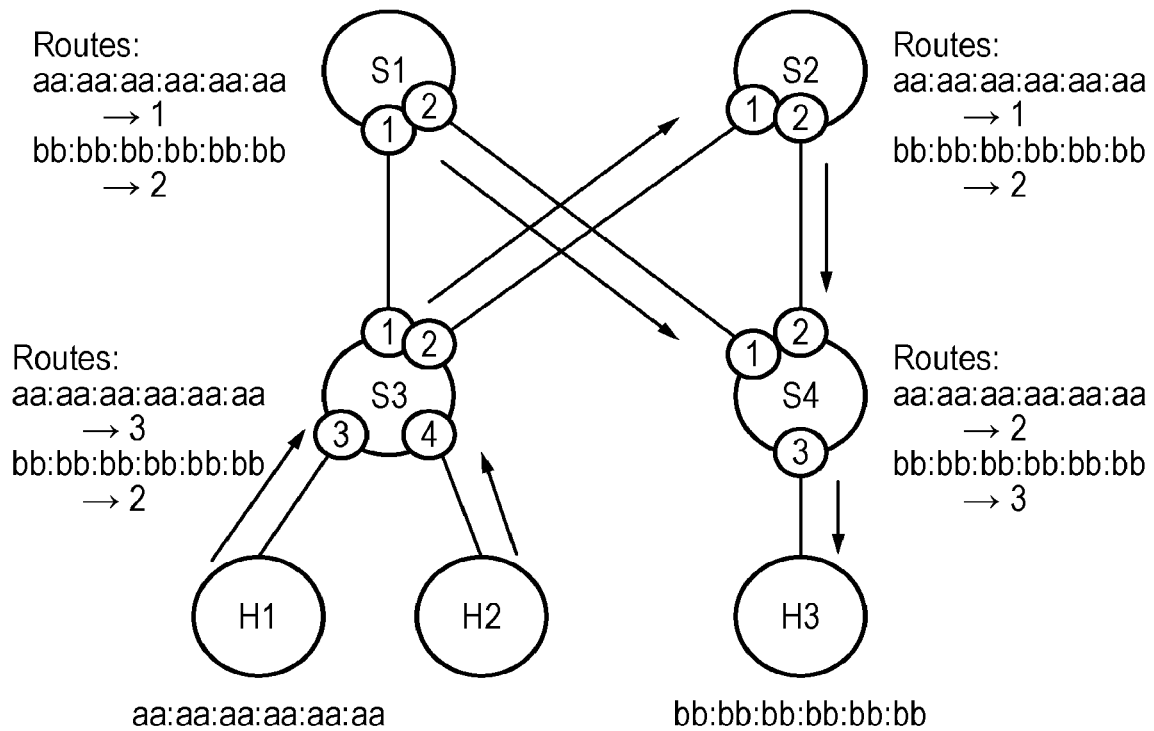

FIGS. 10 and 11 schematically represent an example communication involving hosts H1-H3 and switches S1-S4. Ports on the switches are indicated by numbers in small circles. The host H1 has a MAC address of aa:aa:aa:aa:aa:aa and the host H3 has a MAC address of bb:bb:bb:bb:bb:bb.

FIG. 10 also allows the introduction of the concept of spine nodes and leaf nodes. IN FIG. 10, the switches S1, S2 may be considered as spine switches and the switches S3, S4 as leaf switches.

In examples, the plurality of packet switches comprising at least one spine switch having one or more leaf switches underlying the spine switch. In examples, the leaf switches are arranged in a tree structure underlying the spine switch, and in which the link comprises a link to a lower level in the tree structure.

In general networks, a protocol known as a Spanning Tree that prevents looped paths is usually implemented. This specifies a primary route from one node to another.

In an example of a so-called leaf-spine configuration, all nodes are exactly the same number of segments or links away from one another so as to produce a predictable and consistent amount of delay or latency for traveling information. This is possible by having only two layers, the Leaf layer and Spine layer. The Leaf layer consists of access switches that connect to devices like servers, firewalls, load balancers, and edge routers. The Spine layer (made up of switches that perform routing) is the backbone of the network, where every Leaf switch is interconnected with each and every Spine switch.

A leaf-spine network of this type always has loops, so when using a traditional spanning tree, only one spine switch would be active at a time. This arrangement can be applicable to the Unicast Strategy 1, but the Unicast Strategy 2 could, and the Multicast Strategies to be described below do, make use of more than one or indeed all the spine switches, for example for load balancing.

More generally, leaf switches have access ports which connect to hosts, and trunk ports which connect to spine switches. Spine switches strictly have only trunk ports which connect to leaf switches (or other spine switches, or even 'core' switches one layer higher in the hierarchy, in the general case). The present embodiments, however, do not require this strict case and can allow access ports on spine switches as well.

Referring to FIG. 10, an example packet from the previously unknown MAC address aa:aa:aa:aa:aa:aa is received on the switch S3 Port 3. The arrows represent a spanning tree for H1 as returned by the SpanningTree module 902. The spanning tree for H1 is not necessarily unique; a minimal spanning tree will be chosen if possible. The controller applies the forwarding rules for aa:aa:aa:aa:aa:aa to all switches S1-S4. The packet is also flooded on all access ports of all switches (S3 Port 4 and S4 Port 3 in this case) to make sure all hosts receive the first packet. Subsequent packets addressed to aa:aa:aa:aa:aa:aa will be routed through the network using the forwarding rules that have just been applied.

Similarly, in FIG. 11, when a packet from the previously unknown MAC address bb:bb:bb:bb:bb:bb is received on S4 Port 3, a different Spanning Tree for host H3 is obtained from the SpanningTree module 902 (as shown by the arrows), forwarding rules for bb:bb:bb:bb:bb:bb are applied, and the packet is flooded to the access ports of all switches (S3 Port 3 and S3 Port 4 in this case).

Host-Specific Spanning Trees

Other example embodiments can encompass the following, involving the generation and use of a host-specific spanning tree. A global spanning tree concerns the whole network and is not likely to be optimal for any individual host. A host specific spanning tree puts the given host at the root of the tree and can therefore be made optimal (or at least potentially better) for that host.

In these examples, the SDN controller 800 can generate a separate minimal spanning tree specific to each host as its MAC address is encountered. The forwarding rules for that spanning tree are then written to each switch in the network by the SDN controller 800. Optionally, OpenFlow cookies used in this process could be set to a hash or other derivative of the MAC address which would allow the routes to be updated/deleted easily (for example, on a subsequent topology change). The original packet is then flooded to all access ports.

Each host specific spanning tree would have the originating host at its root, and would therefore be minimal (in the sense of relatively small, rather than necessarily requiring an absolute lowest size) and/or optimal (in the sense of relatively good, rather than necessarily requiring to be the absolute best) for that host. For example, in cases of load balancing discussed below, a larger/longer tree might be chosen to avoid congestion. This is a potential improvement over the Spanning Tree protocol in non-SDN networks, where the single 'global spanning tree' is not guaranteed to be optimal for any or all of the hosts.

Note that the aim towards achieving so-called 'minimal' and 'optimal' spanning trees for each host is that the controller can take into account other host specific spanning trees that have already been assigned at that stage, or take into account the actual amount of traffic on the network links, measured at that point in time, or averaged over a recent time period. Note also that non-SDN arrangements typically just select a single spanning tree based on the smallest number of hops or links from a potentially arbitrarily chosen root node.

In a looped network like leaf-spine, or when using multiple links between switches, this arrangement could provide a degree of load balancing that would not be possible using a non-SDN spanning tree protocol. The spanning tree generation algorithm would take into account the current loading on the links. For example, even if hosts aa:aa:aa:aa:aa:aa and bb:bb:bb:bb:bb:bb are on the same access switch, the spanning tree for the former might be assigned via a different spine switch or multi-link to that of the latter. This could potentially be better than the typical non-SDN case of disabling most of the links to remove potential loops.

These embodiments could be applicable to broadcast networks and more widely (for example in data centres), as it does allow some level of load balancing in 'looped' network topologies, such as leaf-spine, and topologies using multi-links.

Embodiments of this arrangement may be described by the following paragraphs:

A packet-based software-defined data network supporting at least unicast packet-based data communication, the data network comprising: a software defined network (SDN) controller; and a network of one or more hosts connected via one or more switches, in which the SDN controller is configured to perform unicast routing between the hosts using a separate spanning tree applicable to (for example rooted on) each host in the data network, and to apply the routes for each host globally to the data network.

In examples of this arrangement, the data network host and switch topology are provided to the SDN controller by one or both of: a static configuration (for example, one or more configuration files or other documents) and by automatic discovery.

In examples of this arrangement, the network topology contains loops and/or multi-links, and the spanning trees may (or indeed may not) use a plurality of different paths through this network without any links being permanently disabled. In example arrangements this can provide load balancing between the links and/or switches.

In examples of this arrangement, the spanning trees can be pre-calculated for all hosts using the switch and host topology.

In examples of this arrangement, the forwarding rules can be applied at initialisation time.

In examples of this arrangement the spanning trees may be calculated globally for each host on demand, for example in response to encountering a previously unknown MAC address at an access port. In some examples the forwarding rules may be applied at the time the new MAC address is detected.

In examples of this arrangement, the forwarding rules implementing the spanning trees can be forgotten or discarded in response to a detection of a change in the topology.

In examples of this arrangement, the forwarding rules implementing the spanning trees can be forgotten, discarded or re-calculated in response to a detection of a change in the amounts of network traffic across some or all routes, in order to aim to achieve or improve load balancing and potentially to alleviate network congestion.

For example, in some situations the spanning trees may be re-calculated to change the load balancing. SDN allows the amounts of traffic to be measured at a point in time (or in other words over a short period), or averaged over a longer time period. In some examples of a network, especially one using TCP, an SDN controller could monitor the levels of traffic on the links in real time, and re-calculate one or more or all of the spanning trees to alleviate any congestion that is detected.

In examples of this arrangement, the spanning trees may be so-called least cost spanning trees, calculated by minimising or at least aiming to reduce a cost function. For example, the cost function may indicate a number of links. For example, the cost function can indicate the assigned network traffic to a switch and/or a link. For example, the cost function can indicate the current amounts of network traffic on the network links, measured in real time and/or averaged over a suitable time period. A combination of these, or another cost function, may be used.

Broadcast Routing

The arrangement of FIG. 9 may be used in connection with broadcast routing.

Regardless of whether a MAC Learning with Reverse Path Flooding (Unicast Routing Strategy 1), or Host Specific Spanning Trees (Unicast Strategy Option 2) are used, the SpanningTree module 902 will generate a Global Spanning Tree for the purposes of Broadcast. This is similar to Reverse Path Unicast, but with a single fixed route.

Broadcast is supported via L2 (MAC addresses) rather than L3 (IP addresses). This assumes the L3 broadcast address will be resolved to the L2 broadcast address by ARP (address resolution protocol) at the endpoints. ARP only requires L2 broadcast to operate correctly.

L2 broadcast forwarding rules are applied globally to each switch based on the Global Spanning Tree. Separate forwarding rules are applied for packets arriving on each port. This means loop-free broadcast can be achieved globally without having to send packets to the controller during normal operation (i.e. high performance).

When the topology changes, the L2Routing module is notified, and all broadcast routes are updated based on a newly calculated Global Spanning Tree.

When new hosts join the network the multicast broadcast routes may also need updating. If using Unicast Routing Strategy 2 (Host Specific Spanning Trees), the unicast routes and broadcast forwarding rules would all be re-written to the switches together in response to a topology change.

Like non-broadcast unicast routing, multiple links (as opposed to loops) are simplified by choosing a single link and disabling the others. This single link could be chosen for example at random or by some other suitable strategy.

In summary, in example embodiments, for a unicast or a broadcast data traffic type, the SDN controller is configured to define a spanning tree applicable to the network, and to communicate routing information based on the spanning tree to each packet switch in the data network. For example, for a unicast or a broadcast data traffic type, the SDN controller may be configured to define a respective spanning tree applicable to each packet source.

In other examples, a low (where low might be below a threshold data or packet rate, or below a certain proportion of another traffic type's packet rate) bandwidth traffic of a given traffic type is routed by sending the incoming packets to the SDN controller, and the controller causing those packets to be emitted directly from all output ports of all switched that are determined to be connected to a packet receiver associated with the given traffic type. For example, if it is assumed that broadcast traffic is low bandwidth, and because broadcast traffic by definition has potentially complicated and wide-ranging routes requiring many flows, for simplicity it is possible just to send the broadcast packets to the controller, and the controller then sends an OpenFlow PacketOut command containing that broadcast packet to each access switch, to output to each if its access ports. (Here, an access switch is a switch with access ports, and an access port is a port connected to an endpoint, not another switch.)

Multicast Routing

Figure 12:
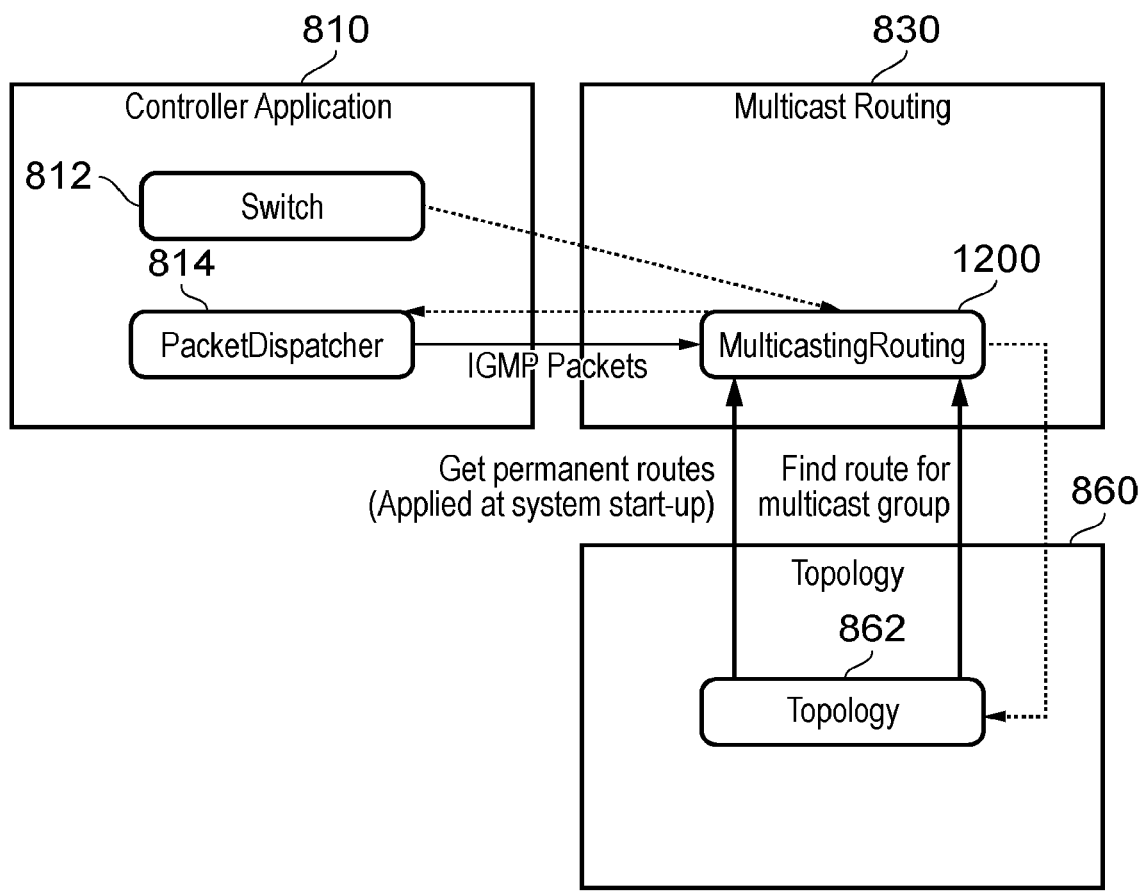
FIG. 12 schematically illustrates an example of multicast data transmission.

Referring to FIG. 12, for multicast routing, the Topology module 862 reads a static topology model from a JSON file. This topology includes information about the locations of source devices, and optionally the preferred routes between switches for each possible multicast group.

Alternatively, the JSON file could just contain information about the known devices, and the preferred routes, which would augment the topology discovered by LLDP by the Topology module 862.

Therefore, in example embodiments the SDN controller can be configured to detect the topology by querying the plurality of packet switches according to a Link Layer Discovery Protocol (LLDP).

In example embodiments, the data defining the topology can comprise one or more configuration files. For example, the one or more configuration files comprise at least one JavaScript Object Notation (JSON) configuration file.

Instead of the IGMPSnooping module 834 an alternative MulticastRouting module 1200 may be used. This module 1200 receives IGMP packets, and queries the Topology module 862 for a preferred route between the joining endpoint and the pre-determined source of that group. The preferred route might be determined using static routes defined in a configuration file, or by using load balancing using a least-cost graph search algorithm. The MulticastRouting module 1200 is responsible for tracking any flow entries that need to be added or removed as a consequence.

The 'source' could be either the actual source device, located from the known-devices JSON file (for full multicast routing), for example.

The MulticastRouting module 1200 can also query the Topology module 862 for any permanent routes (for example routes to the Spine) for each switch when that switch joins the controller.

The MulticastRouting module 1200 intercepts IGMP messages at the border of the network, but unlike the IGMPSnooping module it does not forward them between switches. Instead, it uses the network topology to apply routes globally. In some alternative examples, the Topology module 862 and a schedule of known devices in JSON form may be replaced by an LLDP based topology module that provides the same interface to the MulticastRouting module 1200. Similarly, the Topology module 862 may be implemented by a module that dynamically load balances multicast traffic.

In some example embodiments, multi-path routing and load balancing is achieved on a per-stream rather than per-packet basis, as the system being described may be arranged to assume in-order packets. Load balancing on a per-packet basis (e.g. by aggregating links, for example using suitable switch hardware) might lead to the generation of out-of-order packets.

Examples of Static Multicast Routing

Figure 13:
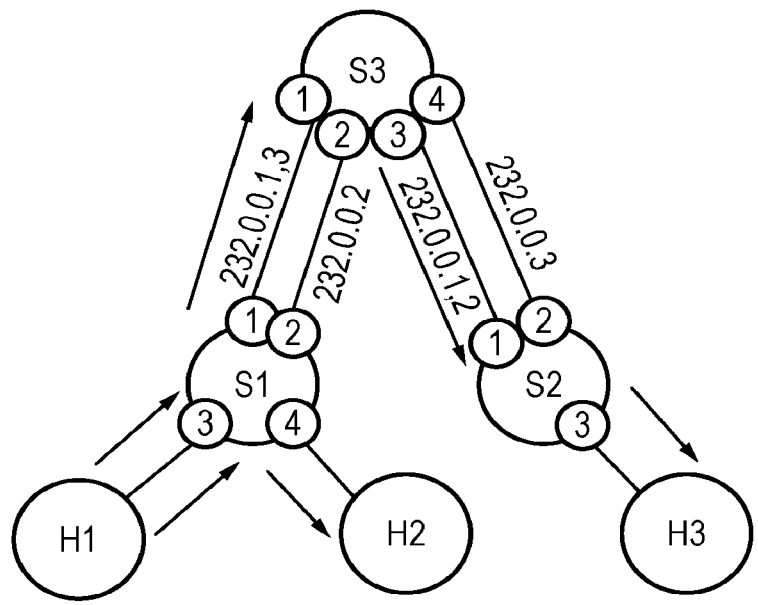
FIGS. 13 to 15 schematically represent example communications.
Figure 14:
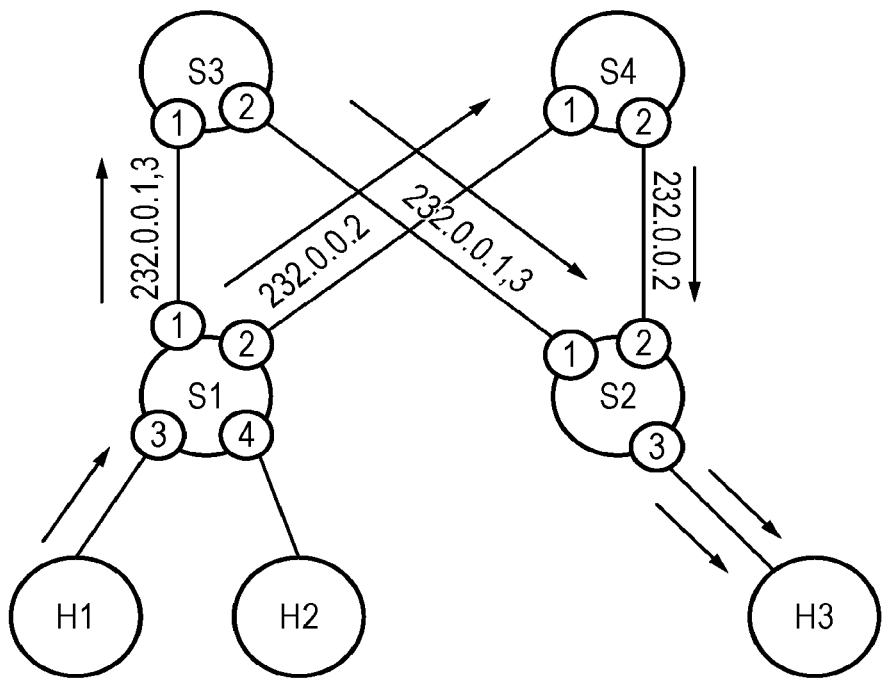
Figure 15:
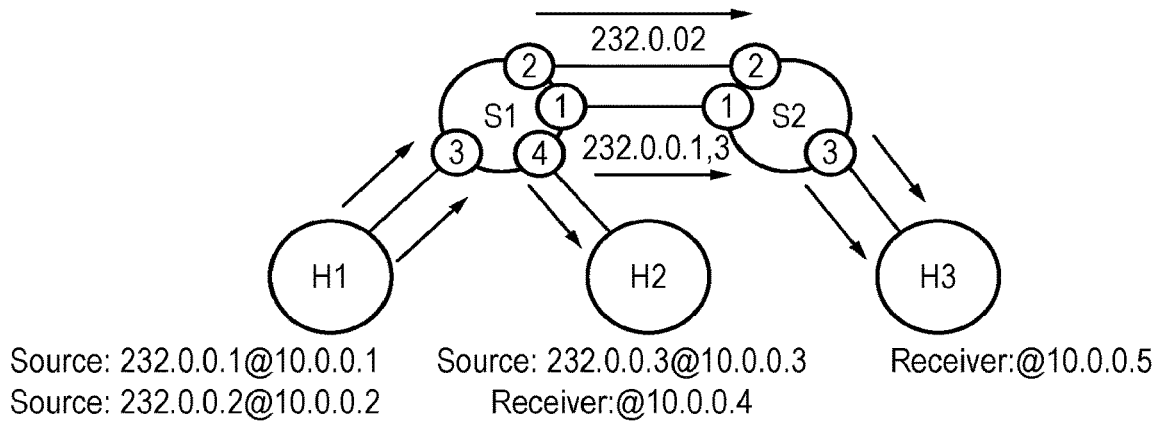

FIGS. 13 to 15 provide schematic illustrations of example arrangements, for a single spine arrangement (FIG. 13), a multi-spine arrangement (FIG. 14) and a point to point arrangement (FIG. 15), each as specified by associated JSON files. Once again, the hosts are designated as H1 . . . H3 and the switches are numbered as Sn (where n is an integer), with switch ports being identified by numbers in small circles.

Referring to FIG. 13, a receiver H3 (IP address 10.0.0.5) connects to a source 232.0.0.1 (10.0.0.1). An IGMP Join packet is received from H3 on Port 3 of Switch S2, and is forwarded to the controller.

The controller receives the IGMP message, looks up Source 232.0.0.1 in the topology model, and determines that this multicast group can be obtained from Host H1 connected to Port 3 of S1.

The MulticastRouting module queries the Topology module, which calculates a route through the network from H1 to H3 using a least-cost graph search algorithm, taking into account the existing allocated network traffic as the graph weightings.

The Topology module allocates this route and updates its graph weightings accordingly. It then returns the allocated route [S1 Port 3→S1 Port 1; S3 Port 1→S3 Port 3; S2 Port 1→S2 Port 3] to the MulticastRouting module.

The MulticastRouting module then updates the forwarding rules of all relevant switches to apply the route.

Note that FIG. 13 provides an example in which the topology of interconnections defines at least one instance of two or more parallel interconnections between a pair of the switches, packet sources and packet receivers (such as between S3 and S2). For example, the packet switches S3, S2 each have a plurality of ports; and at least two of the packet switches S2, S3 are connected to one another by links between at least two ports (ports 3,4 on S3 and ports 1,2 on S2) on each of the at least two packet switches.

Referring to FIG. 14 in another example, a receiver H3 (IP address 10.0.0.5) connects to a source 232.0.0.1 (10.0.0.1). An IGMP Join packet is received from H3 on Port 3 of Switch S2, and is forwarded to the controller.

The controller receives the IGMP message, looks up Source 232.0.0.1 in the topology model, and determines that this multicast group can be obtained from Host H1 connected to Port 3 of S1.

The MulticastRouting module queries the Topology module, which calculates a route through the network from H1 to H3 using a least-cost graph search algorithm, taking into account the existing allocated network traffic as the graph weightings.

The Topology module allocates this route and updates its graph weightings accordingly. It then returns as an example the allocated route [S1 Port 3→S1 Port 1; S3 Port 1→S3 Port 2; S2 Port 1→S2 Port 3] to the MulticastRouting module.

The MulticastRouting module then updates the forwarding rules of all relevant switches to apply the route.

Note that FIG. 14 provides an example in which the network of packet switches comprises at least one loop whereby a port of a packet switch (such as S1 port 1) is connected to another port of that packet switch (such as S1 port 2) via one or more other packet switches (such as S3, S2, S4).

Referring to FIG. 15 in another (point to point) example, a receiver H3 (IP address 10.0.0.5) connects to a source 232.0.0.1 (10.0.0.1). An IGMP Join packet is received from H3 on Port 3 of Switch S2, and is forwarded to the controller.

The controller receives the IGMP message, looks up Source 232.0.0.1 in the topology model, and determines that this multicast group can be obtained from Host H1 connected to Port 3 of S1.

The MulticastRouting module queries the Topology module, which calculates a route through the network from H1 to H3 using a least-cost graph search algorithm, taking into account the existing allocated network traffic as the graph weightings.

The Topology module allocates this route and updates its graph weightings accordingly. It then returns as an example the allocated route [S1 Port 3→S1 Port 1; S2 Port 2→S2 Port 2] to the MulticastRouting module. The MulticastRouting module then updates the forwarding rules of all relevant switches to apply the route.

For another receiver at 10.0.0.4, the allocated route may be [S1 Port 3→S1 Port 4.

Operations of the controller will now be described with reference to FIGS. 16 to 18.

Figure 16:
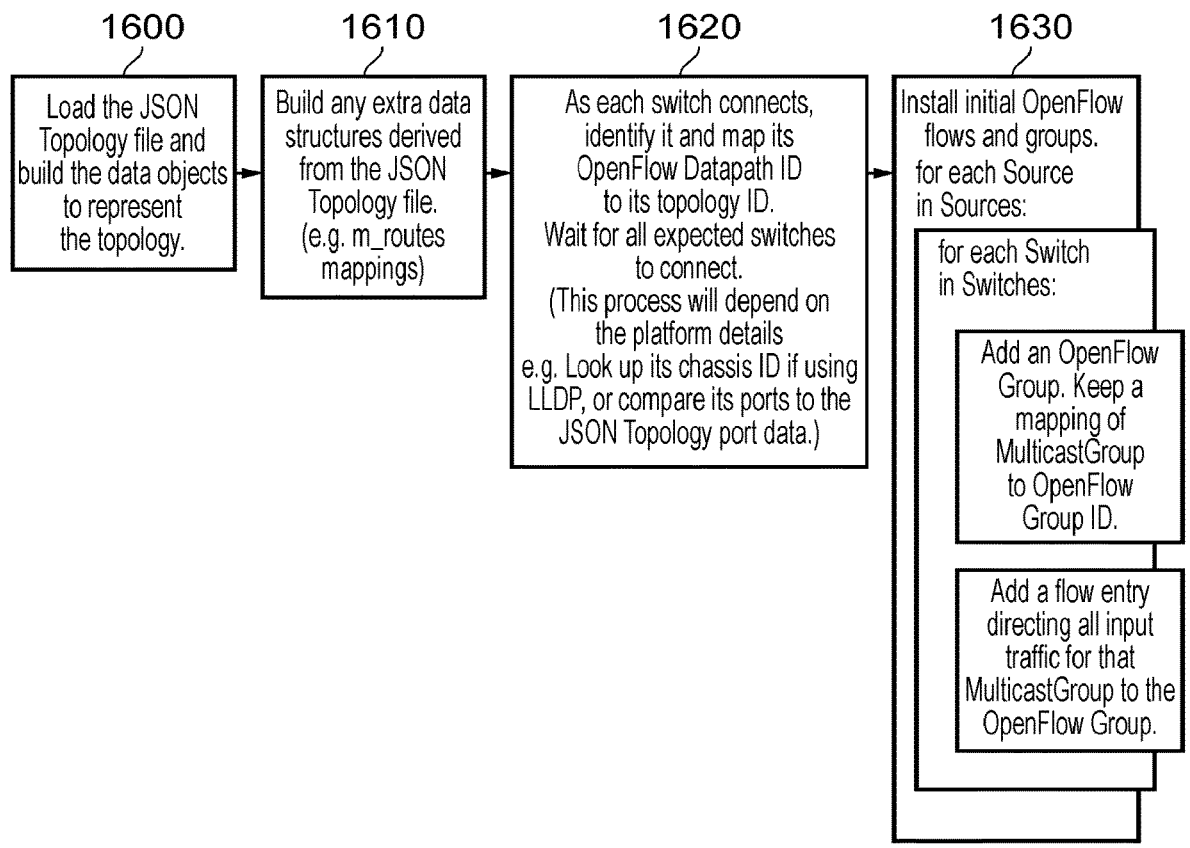
FIGS. 16 to 18 are schematic flow diagrams illustrating respective methods.

FIG. 16 is a schematic flow diagram illustrating a method of initializing a network.

At a step 1600, the controller (for example, the Topology module 862) loads the JSON Topology file and build the data objects to represent the topology.

At a step 1610, the controller builds any extra data structures derived from the JSON Topology file, such as multicast route mappings.

At a step 1620, as each switch connects, the controller identifies it and maps its OpenFlow Datapath ID to its topology ID. The controller waits for all expected switches to connect.

At a step 1630, the controller installs initial OpenFlow flows and groups. For each Source, and then for each switch, the controller adds an OpenFlow Group and maintains a mapping of MulticastGroup to OpenFlow Group ID; and adds a flow entry directing all input traffic for that MulticastGroup to the OpenFlow Group.

Figure 17:
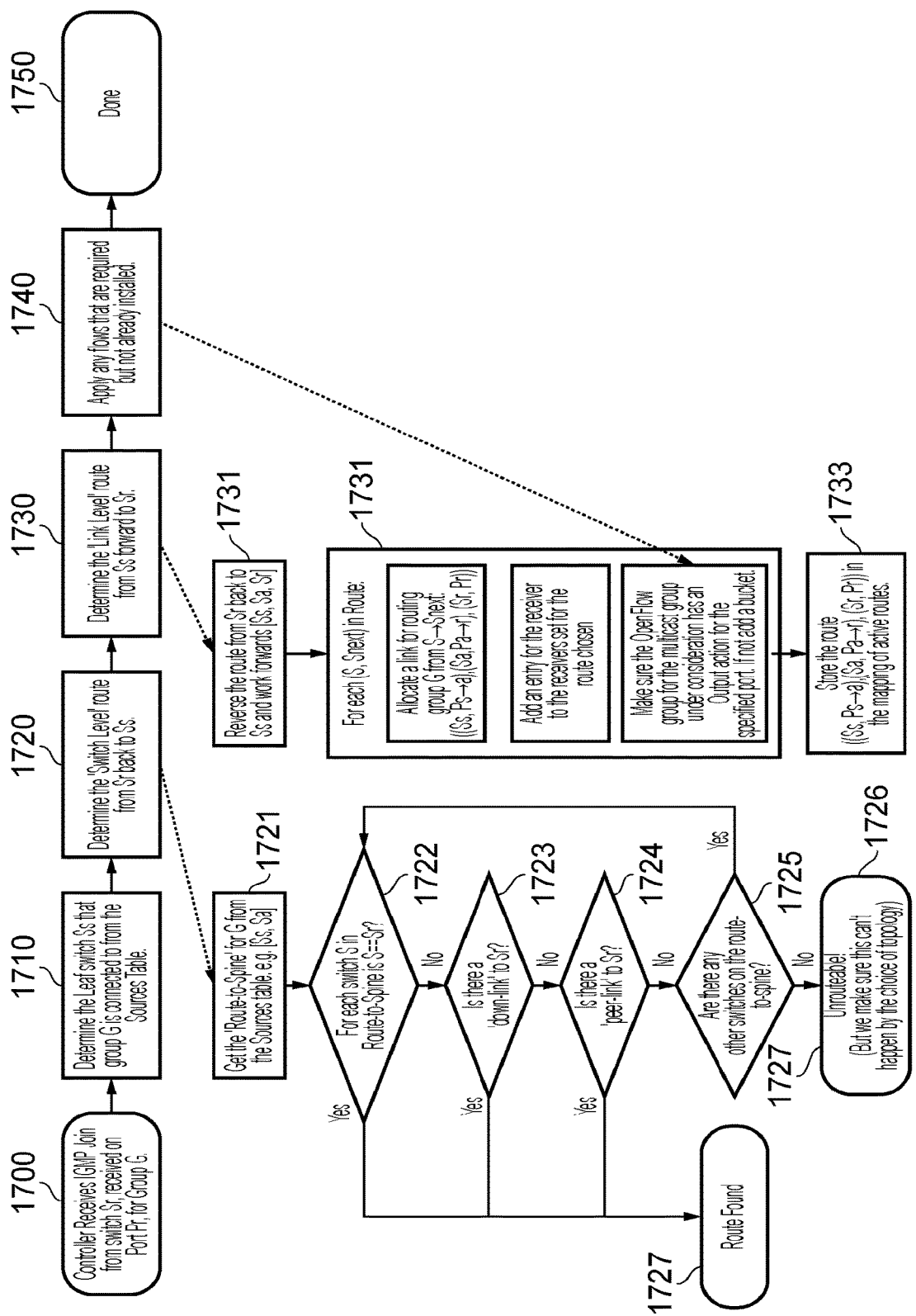

FIG. 17 is a schematic flowchart representing an example method of joining a Multicast group, starting with a step 1700 at which the controller receives an IGMP join message from a particular switch (Sr) on a port Pr for a group G.

At a step 1710 the controller determines the Leaf switch Ss that the group G is connected to from the Sources table, leading to a step 1720 at which the controller determines a switch level route from Sr back to Ss.

Purely by way of example, the step 1720 may involve a step 1721 at which the controller obtains a route to the spine for the group G. At a step 1722, the controller checks whether any of the switches in the route to the spine are the same as the switch Sr from which the IGMP join message was received. If the answer is yes then control passes to a step 1727 and a route has been found. If not, the controller searches for a down link to the switch Sr and if one is found then control passes to the step 1727. If not, the controller searches for a peer-link to Sr and if one is found then control passes again to the step 1727. If not, control passes to a step 1725 at which the controller detects whether there are any other switches on the route to the spine. If yes, then the steps 1722 ... 1725 are repeated. If no, then the Multicast join process is unrouteable.

After the step 1720, control passes to a step 1730 formed of sub-steps 1731 ... 1733. The step 1730 involves determining a link level route from Ss to Sr. The sub-step 1731 involves reversing the route from Sr back to Ss and working forwards. The step 1732 involves successively allocating links for routing the group G from each switch to the next switch in the route, and the step 1733 involves storing the route in the mapping of active routes.

Control then passes to a step 1740 at which any flows that are required but not already installed are applied, and the process terminates at a step 1750.

Figure 18:
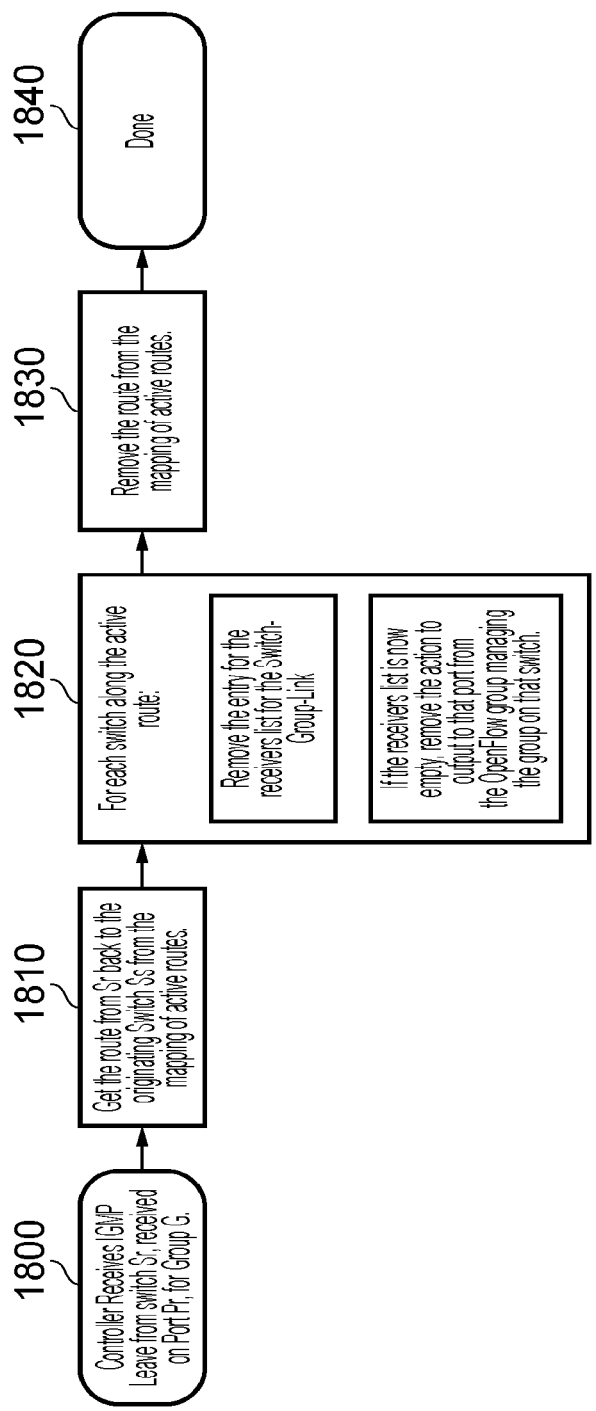

FIG. 18 is a schematic flowchart illustrating a method of leaving a Multicast group.

At a step 1800, the controller receives an IGMP leave message from a switch Sr, on a port Pr, for a group G.

At a step 1810 the controller obtains the route from Sr back to the originating switch Ss from the mapping of currently active routes.

Then, at a step 1820, for each switch along the active route the entry relating to that routing is removed and then at a step 1830 the entire route is removed from the mapping of active routes. The process terminates at a step 1840.

In summary, in example embodiments, for a multicast data traffic type, the SDN controller can be configured to detect a source packet switch associated with the packet source and a further switch in a communication path with the source packet switch, and to detect, for each switch in a route between the source packet switch and the further switch, whether a link exists in the topology of interconnections towards a receiver packet switch associated with the packet receiver.

Strategy Selection

The strategies or algorithms discussed above can apply to different data traffic types. The SDN controller is configured to select a strategy or algorithm in dependence upon a data traffic type to be routed. In this way, the SDN controller 800 of FIG. 8 provides an example of a software defined network (SDN) controller for use in a packet-based software-defined data network supporting multicast, unicast and/or broadcast packet-based data traffic types and having a network of one or more packet switches arranged to route, under the control of the SDN controller, data packets from one or more packet sources to one or more packet receivers;

in which the SDN controller is responsive to data defining a topology of interconnections between the plurality of packet switches, packet sources, and packet receivers, to select a route for packets from a packet source to a packet receiver;

the SDN controller being configured to select the route in dependence upon the traffic type of the packets to be routed, using a respective one of a set of route selection algorithms each applicable to one of multicast, unicast and broadcast packet-based data traffic types, or to other network parameters, such as a range of source or destination addresses, or some other non-network metric, for example defined in the endpoint information. Note that the traffic type can be defined by its address (such as an IPv4 address). Broadcast traffic has a specific address. Multicast traffic has a specific range of addresses. Alternatively the traffic type can be defined by another aspect of the packet such as header information.

Load Balancing

Figure 19:
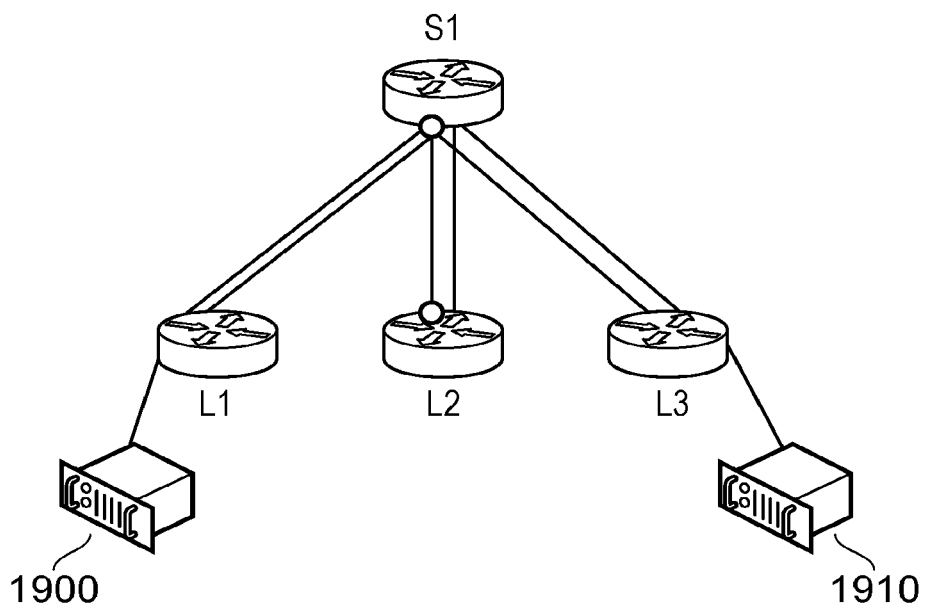
FIGS. 19 and 20 schematically illustrate an example of multicast load balancing.
Figure 20:
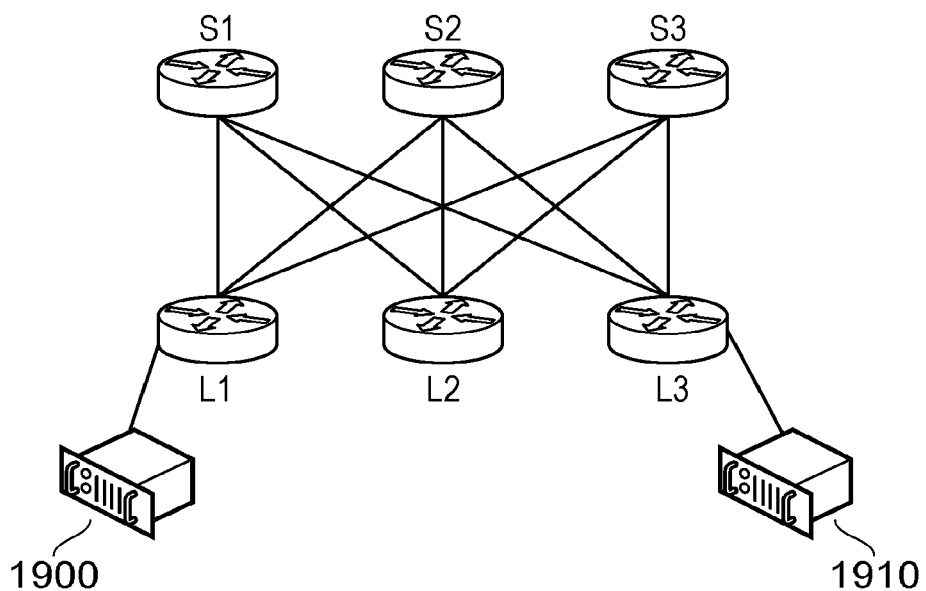

FIGS. 19 and 20 relate to Multicast load balancing and will be described below, though they are also suitable for load balancing unicast traffic. FIG. 19 schematically represents an arrangement of three leaf nodes L1-L3 all connected via a single switch S1 acting as a spine node. In FIG. 20, the leaf nodes L1-L3 have a selection of possible routes via multiple switches S1-S3. In each of FIGS. 19 and 20, Source apparatus 1900 at L1 is communicating with Receiver apparatus 1910 at the node L3 by Multicast transmission.

Example embodiments can use a version of Dijkstra's Shortest Path algorithm (or another suitable graph search algorithm) to find the lowest "cost" route from Source to Receiver. In this regard, multiple links between switches (a 'link group') are treated as a single link for a path finding algorithm. Individual links in the link group are weighted by the number of flows assigned to them already (or by bandwidth*flows if using mixed bandwidths).

Individual links are weighted as 'zero' if the link is already carrying that multicast group.

The lowest weight link from the link group will be used as the link for the path finding algorithm.

Optionally, different weighting strategies could be used, for example, adding an extra small fixed per-hop link weighting to avoid long but existing routes dominating short but comparatively congested routes if latency is a problem.

The receiver node is known from the IGMP Join message.

The source node is known from the 'known devices' JSON file (Phase 1) or (in other examples) LLDP and the learned topology. The least cost path is then found through the network from source to receiver, adding any flows needed to apply the route. In example embodiments, once flows have been added they should not be changed (unless a topology change forces it) to avoid the risk of packet loss. So, the process may be summarized as:

On IGMP join:
Calculate new least cost route through network.
Update link weights.
Apply flow rules.
On IGMP leave:
Remove unneeded flow rules.
Update link weights.
On link removed:
Re-route any multicast groups being carried by the link that was removed.

Therefore, in example embodiments, the SDN controller can be is configured to select between two or more candidate routes from the packet source to the packet receiver in dependence upon a cost function. For example, the SDN controller may be configured to select between two or more candidate routes from the packet source to the packet receiver so as to select a candidate route with a cost function indicating a lowest cost.

In some examples, the SDN controller is configured:
to establish a route from the packet source to the packet receiver by allocating data flows to links between the plurality of packet switches, packet sources, and packet receivers so that the allocated data flows define the selected route; and
in which the cost function is dependent upon at least a number of data flows already allocated to links within each of the candidate routes.

Examples of the cost function can therefore include one or more of:
 a cost function dependent upon at least the link bandwidths within each of the candidate routes.
 a cost function dependent upon a number of sequential links within each of the candidate routes.
 a cost function dependent upon a number of switch to switch hops associated with a candidate route.
 a cost function dependent upon the amount of traffic already assigned to alternative candidate routes.
 a cost function combining one or more of the above cost functions.

Figure 21:
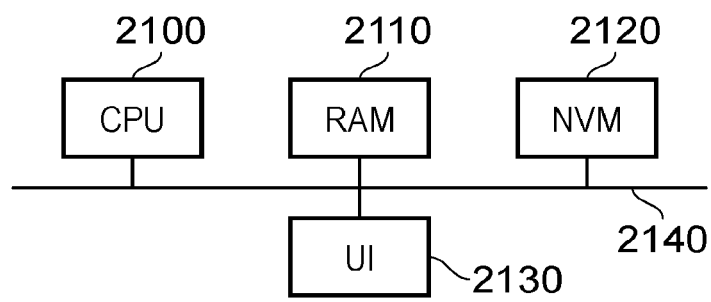
FIG. 21 schematically illustrates a data processing apparatus.

Data Processing Apparatus (FIG. 21)

FIG. 21 schematically illustrates a data processing apparatus comprising: one or more processing elements such as a central processing unit (CPU) 2100 to execute program instructions; a random access memory (RAM) 2110, a non-volatile memory (NVM) 2120 such as a read-only memory, a magnetic or optical disc, or a flash memory, for example to store program instructions to be loaded to RAM for execution, and a user interface (UI) 2130 to provide user control of operations and user output. All of these items are connected by a bus structure 2140. Using the apparatus of FIG. 21, the arrangements described above can be implemented and in particular, the method to be described with reference to FIG. 22 can be implemented by computer software which, when executed by a computer such as that of FIG. 21, causes the computer to perform such a method. A machine-readable non-transitory storage medium such as the NVM 2120 may be used to store such computer software.

Figure 22:
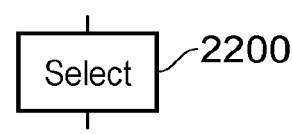
FIG. 22 is a schematic flow diagram illustrating a method.

FIG. 22 is a schematic flowchart illustrating a method of operation of a software defined network (SDN) controller in a packet-based software-defined data network supporting multicast, unicast and/or broadcast packet-based data traffic types having a network of one or more packet switches arranged to route, under the control of the SDN controller, data packets from one or more packet sources to one or more packet receivers a plurality of packet switches arranged to route, under the control of the SDN controller; the method comprising:

the SDN controller, in response to data defining a topology of interconnections between the plurality of packet switches, packet sources, and packet receivers, selecting (at a step 2200) a route for packets from a packet source to a packet receiver;

in which the selecting step 2200 comprises selecting the route in dependence upon the traffic type of the packets to be routed, using a respective one of a set of route selection algorithms each applicable to one of multicast, unicast and broadcast packet-based data traffic types.

A data network including such an SDN controller can be of the type shown in FIG. 2, for example, and represents an example of a packet-based software-defined data network supporting multicast, unicast and/or broadcast packet-based data traffic types, the data network comprising: a software defined network (SDN) controller as defined above; and a network of one or more packet switches arranged to route, under the control of the SDN controller, data packets from one or more packet sources to one or more packet receivers.

In so far as embodiments of the disclosure have been described as being implemented, at least in part, by software-controlled data processing apparatus (which is the case for all of the software-implemented features discussed above, for example being implemented by program instructions running on the apparatus of FIG. 21), it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. A packet-based software-defined data network supporting multicast, unicast and/or broadcast packet-based data traffic types, the data network comprising:

a software defined network (SDN) controller; and a network of one or more packet switches arranged to route, under the control of the SDN controller, data packets from one or more packet sources to one or more packet receivers, in which the SDN controller is responsive to data defining a topology of interconnections between the plurality of packet switches, packet sources, and packet receivers, to select a route for packets from a packet source to a packet receiver;

the SDN controller being configured to select the route in dependence upon the traffic type of the packets to be routed, using a respective one of a set of route selection algorithms each applicable to one of multicast, unicast and broadcast packet-based data traffic types.

2. A data network according to clause 1, in which the topology of interconnections defines at least one instance of two or more parallel interconnections between a pair of the switches, packet sources and packet receivers.

3. A data network according to clause 1 or clause 2, in which:
   the packet switches have a plurality of ports; and
   at least two of the packet switches are connected to one another by links between at least two ports on each of the at least two packet switches.

4. A data network according to any one of the preceding clauses, in which the network of packet switches comprises at least one loop whereby a port of a packet switch is connected to another port of that packet switch via one or more other packet switches.

5. A data network according to any one of the preceding clauses, in which the SDN controller is configured to select between two or more candidate routes from the packet source to the packet receiver in dependence upon a cost function.

6. A data network according to clause 5, in which the SDN controller is configured to select between two or more candidate routes from the packet source to the packet receiver so as to select a candidate route with a cost function indicating a lowest cost.

7. A data network according to clause 5 or clause 6, in which the SDN controller is configured:
   to establish a route from the packet source to the packet receiver by allocating data flows to links between the plurality of packet switches, packet sources, and packet receivers so that the allocated data flows define the selected route; and
   in which the cost function is dependent upon at least a number of data flows already allocated to links within each of the candidate routes.

8. A data network according to any one of clauses 5 to 7, in which the cost function is dependent upon at least the link bandwidths within each of the candidate routes.

9. A data network according to any one of clauses 5 to 8, in which the cost function is dependent upon a number of sequential links within each of the candidate routes.

10. A data network according to clause 1, where a low bandwidth traffic of a given traffic type is routed by sending the incoming packets to the SDN controller, and the controller causing those packets to be emitted directly from all output ports of all switched that are determined to be connected to a packet receiver associated with the given traffic type.

11. A data network according to any one of the preceding clauses, in which, for a multicast data traffic type, the SDN controller is configured to detect a source packet switch associated with the packet source and a further switch in a communication path with the source packet switch, and to detect, for each switch in a route between the source packet switch and the further switch, whether a link exists in the topology of interconnections towards a receiver packet switch associated with the packet receiver.

12. A data network according to any one of the preceding clauses, in which, for a unicast or a broadcast data traffic type, the SDN controller is configured to define a spanning tree applicable to the network, and to communicate routing information based on the spanning tree to each packet switch in the data network.

13. A data network according to any one of the preceding clauses, in which, for a unicast or a broadcast data traffic type, the SDN controller is configured to define a respective spanning tree applicable to each packet source.

14. A data network according to any one of the preceding clauses, in which the SDN controller is configured to detect the topology by querying the plurality of packet switches according to a Link Layer Discovery Protocol (LLDP).

15. A data network according to any one of the preceding clauses, in which the data defining the topology comprises one or more configuration files.

16. A data network according to clause 15, in which the one or more configuration files comprise at least one JavaScript Object Notation (JSON) configuration file.

17. A data network according to any one of the preceding clauses, in which the SDN controller is configured to discard at least one or more of the selected routes in response to detection of a change in the topology.

18. A data network according to any one of the preceding clauses, the plurality of packet switches comprising at least one spine switch having one or more leaf switches underlying the spine switch.

19. A data network according to clause 18, in which the leaf switches are arranged in a tree structure underlying the spine switch, and in which the link comprises a link to a lower level in the tree structure.

20. A data network according to any one of the preceding clauses, in which the packet source is a video packet source, and the packet receiver is a video packet receiver.

21. A software defined network (SDN) controller for use in a packet-based software-defined data network supporting multicast, unicast and/or broadcast packet-based data traffic types and having a network of one or more packet switches arranged to route, under the control of the SDN controller, data packets from one or more packet sources to one or more packet receivers;

in which the SDN controller is responsive to data defining a topology of interconnections between the plurality of packet switches, packet sources, and packet receivers, to select a route for packets from a packet source to a packet receiver;

the SDN controller being configured to select the route in dependence upon the traffic type of the packets to be routed, using a respective one of a set of route selection algorithms each applicable to one of multicast, unicast and broadcast packet-based data traffic types.

22. A method of operation of a software defined network (SDN) controller in a packet-based software-defined data network supporting multicast, unicast and/or broadcast packet-based data traffic types having a network of one or more packet switches arranged to route, under the control of the SDN controller, data packets from one or more packet sources to one or more packet receivers a plurality of packet switches arranged to route, under the control of the SDN controller; the method comprising:

the SDN controller, in response to data defining a topology of interconnections between the plurality of packet switches, packet sources, and packet receivers, selecting a route for packets from a packet source to a packet receiver;

in which the selecting step comprises selecting the route in dependence upon the traffic type of the packets to be routed, using a respective one of a set of route selection algorithms each applicable to one of multicast, unicast and broadcast packet-based data traffic types.

23. Computer software which, when executed by a computer, causes the computer to perform the method of clause 22.

24. A machine-readable non-transitory storage medium which stores computer software according to clause 23.

The invention claimed is:

1. A packet-based software-defined data network supporting multicast, unicast and broadcast packet-based data traffic types, the data network comprising:
a software defined network (SDN) controller; and
a network of one or more packet switches arranged to route, under the control of the SDN controller, data packets from one or more packet sources to one or more packet receivers,
the SDN controller being responsive to data defining a topology of interconnections between the plurality of packet switches, packet sources, and packet receivers, to select a route for packets from a packet source to a packet receiver,
the SDN controller configured to determine a traffic type of the packets,
the SDN controller configured to select, based on the determined traffic type of the packets, a route selection algorithm from a plurality of route selection algorithms, each route selection algorithm corresponding to a respective one of a multicast data traffic type, a unicast data traffic type, and a broadcast packet-based data traffic type, and
the SDN controller further configured to select the route based on the selected route selection algorithm.

2. The data network according to claim 1, wherein the topology of interconnections defines at least one instance of two or more parallel interconnections between a pair of the switches, packet sources, and packet receivers.

3. The data network according to claim 2, wherein:
the packet switches have a plurality of ports; and
at least two of the packet switches are connected to one another by links between at least two ports on each of the at least two packet switches.

4. The data network according to claim 1, wherein the network of packet switches comprises at least one loop whereby a port of a packet switch is connected to another port of that packet switch via one or more other packet switches.

5. The data network according to claim 1, wherein the SDN controller is configured to select between two or more candidate routes from the packet source to the packet receiver in dependence upon a cost function.

6. The data network according to claim 5, wherein the SDN controller is configured to select between two or more candidate routes from the packet source to the packet receiver so as to select a candidate route with a cost function indicating a lowest cost.

7. The data network according to claim 5, wherein the SDN controller is configured:
to establish a route from the packet source to the packet receiver by allocating data flows to links between the plurality of packet switches, packet sources, and packet receivers so that the allocated data flows define the selected route; and in which the cost function is dependent upon at least a number of data flows already allocated to links within each of the candidate routes.

8. The data network according to claim 5, wherein the cost function is dependent upon at least the link bandwidths within each of the candidate routes.

9. The data network according to claim 5, wherein the cost function is dependent upon a number of sequential links within each of the candidate routes.

10. The data network according to claim 1, wherein a low bandwidth traffic of a given traffic type is routed by sending the incoming packets to the SDN controller, and the controller causing those packets to be emitted directly from all output ports of all switched that are determined to be connected to a packet receiver associated with the given traffic type.

11. The data network according to claim 1, wherein, for a multicast data traffic type, the SDN controller is configured to detect a source packet switch associated with the packet source and a further switch in a communication path with the source packet switch, and to detect, for each switch in a route between the source packet switch and the further switch, whether a link exists in the topology of interconnections towards a receiver packet switch associated with the packet receiver.

12. The data network according to claim 1, wherein, for a unicast or a broadcast data traffic type, the SDN controller is configured to define a spanning tree applicable to the network, and to communicate routing information based on the spanning tree to each packet switch in the data network.

13. The data network according to claim 1, wherein, for a unicast or a broadcast data traffic type, the SDN controller is configured to define a respective spanning tree applicable to each packet source.

14. The data network according to claim 1, wherein the SDN controller is configured to detect the topology by querying the plurality of packet switches according to a Link Layer Discovery Protocol (LLDP).

15. The data network according to claim 1, wherein the data defining the topology comprises one or more configuration files.

16. The data network according to claim 15, wherein the one or more configuration files comprise at least one JavaScript Object Notation (JSON) configuration file.

17. A software defined network (SDN) controller for use in a packet-based software-defined data network supporting multicast, unicast, and broadcast packet-based data traffic types and having a network of one or more packet switches arranged to route, under the control of the SDN controller, data packets from one or more packet sources to one or more packet receivers,
the SDN controller being responsive to data defining a topology of interconnections between the plurality of packet switches, packet sources, and packet receivers, to select a route for packets from a packet source to a packet receiver,
the SDN controller configured to determine a traffic type of the packets,
the SDN controller configured to select, based on the determined traffic type of the packets, route selection algorithm from a plurality of route selection algorithms, each route selection algorithm corresponding to a respective one of a multicast data traffic type, a unicast data traffic type, and a broadcast packet-based data traffic, and
the SDN controller further configured to select the route based on the selected route selection algorithm.

18. A method of operation of a software defined network (SDN) controller in a packetbased software-defined data network supporting multicast, unicast and/or broadcast packetbased data traffic types having a network of one or more packet switches arranged to route, under the control of the SDN controller, data packets from one or more packet sources to one or more packet receivers, the method comprising:
- the SDN controller, in response to data defining a topology of interconnections between the plurality of packet switches, packet sources, and packet receivers, selecting a route for packets from a packet source to a packet receiver;
- the SDN controller determining a traffic type of the packets,
- the SDN controller selecting, based on the determined traffic type of the packets, route selection algorithm from a plurality of route selection algorithms, each route selection algorithm corresponding to a respective one of a multicast data traffic type, unicast data traffic type, and a broadcast packet-based data traffic type, and
- the SDN controller further selecting the route based on the selected route selection algorithm.

19. A non-transitory computer readable storage medium having instructions stored therein, which when executed by a processor in a software defined network (SDN) controller, causes the processor to execute a method according to claim 18.

* * * * *